United States Patent [19]

Miyagi et al.

[11] Patent Number: 4,800,863
[45] Date of Patent: Jan. 31, 1989

[54] SYSTEM FOR CONTROLLING INTAKE PRESSURE IN A SUPERCHARGED INTERNAL COMBUSTION ENGINE

[75] Inventors: Hideo Miyagi, Okazaki; Fumiaki Ohya, Toyota; Koji Fukushima, Toyota; Shin Adachi, Toyota, all of Japan

[73] Assignee: Toyota Jidosha Kabushiki Kaisha, Aichi, Japan

[21] Appl. No.: 156,901

[22] Filed: Feb. 17, 1988

Related U.S. Application Data

[62] Division of Ser. No. 862,971, May 14, 1986, Pat. No. 4,766,873.

[30] Foreign Application Priority Data

May 21, 1985 [JP] Japan .................................. 60-106832
May 27, 1985 [JP] Japan .................................. 60-112033

[51] Int. Cl.⁴ .............................................. F02D 23/00
[52] U.S. Cl. .................................. 123/559.3; 123/564
[58] Field of Search ..................... 60/601, 603, 605.1; 123/198 DB, 559.3, 564

[56] References Cited

U.S. PATENT DOCUMENTS

| | | | |
|---|---|---|---|
| 4,434,775 | 3/1984 | Yoshimura et al. | 123/564 |
| 4,466,414 | 8/1984 | Yoshimura et al. | 123/564 |
| 4,503,339 | 7/1985 | Oguma et al. | 123/564 X |
| 4,556,038 | 12/1985 | Okamoto et al. | 123/564 |
| 4,633,670 | 1/1987 | Iwasa | 123/198 DB |
| 4,685,435 | 8/1987 | Denz et al. | 60/603 |

FOREIGN PATENT DOCUMENTS

| | | |
|---|---|---|
| 3437497 | 5/1985 | Fed. Rep. of Germany. |
| 170825 | 10/1983 | Japan. |
| 15626 | 1/1984 | Japan. |
| 168217 | 9/1984 | Japan. |

*Primary Examiner*—Michael Koozo
*Attorney, Agent, or Firm*—Parkhurst, Oliff & Berridge

[57] ABSTRACT

An internal combustion engine is provided with a mechanically operated supercharger in kinematic connection with a crankshaft the engine. The engine is provided with a system for controlling the effect of supercharger, such as a by-pass control valve. A timer is provided for detecting a predetermined short period after the engine is switched to an acceleration condition from the preceding deceleration condition with a fuel-cut, or after a moderate acceleration has begun. The system for controlling the effect of the supercharging is so controlled that the effect of supercharging is weakened during that period.

9 Claims, 30 Drawing Sheets

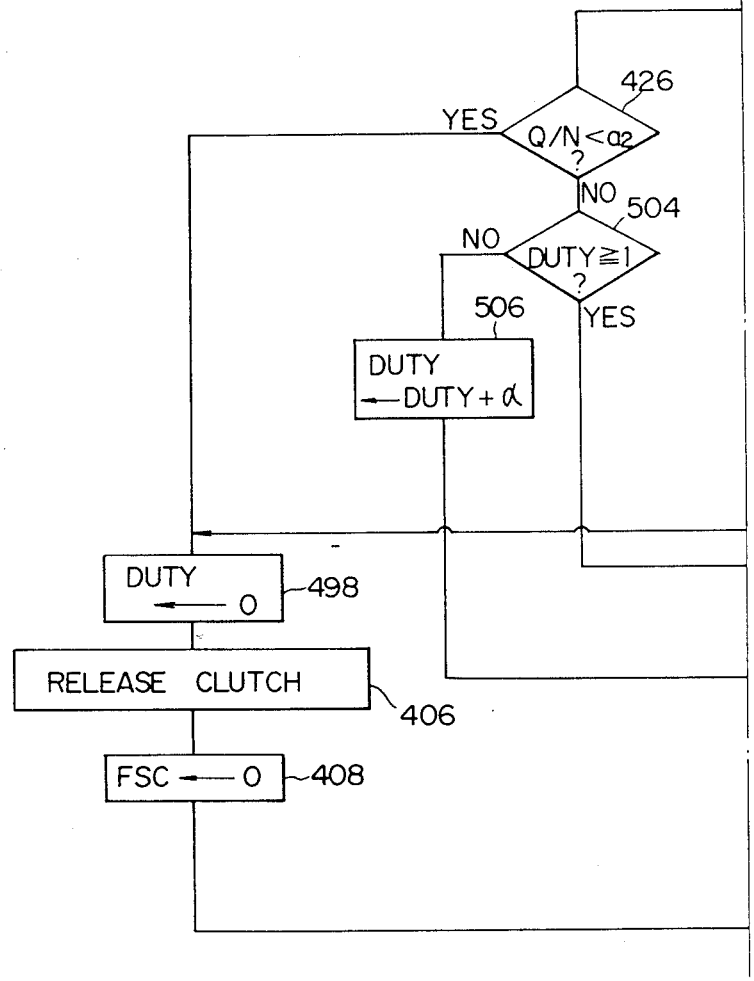

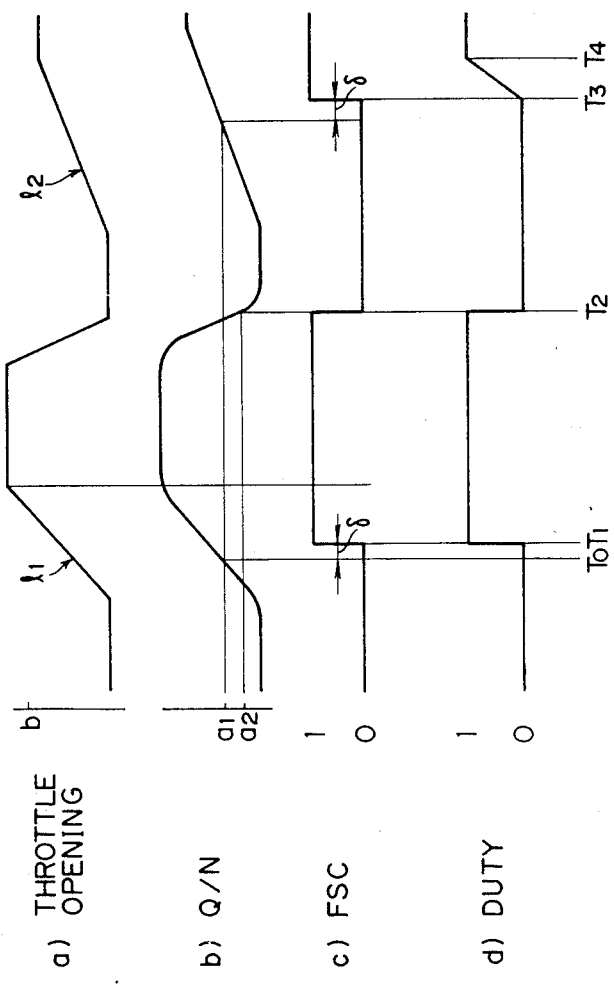

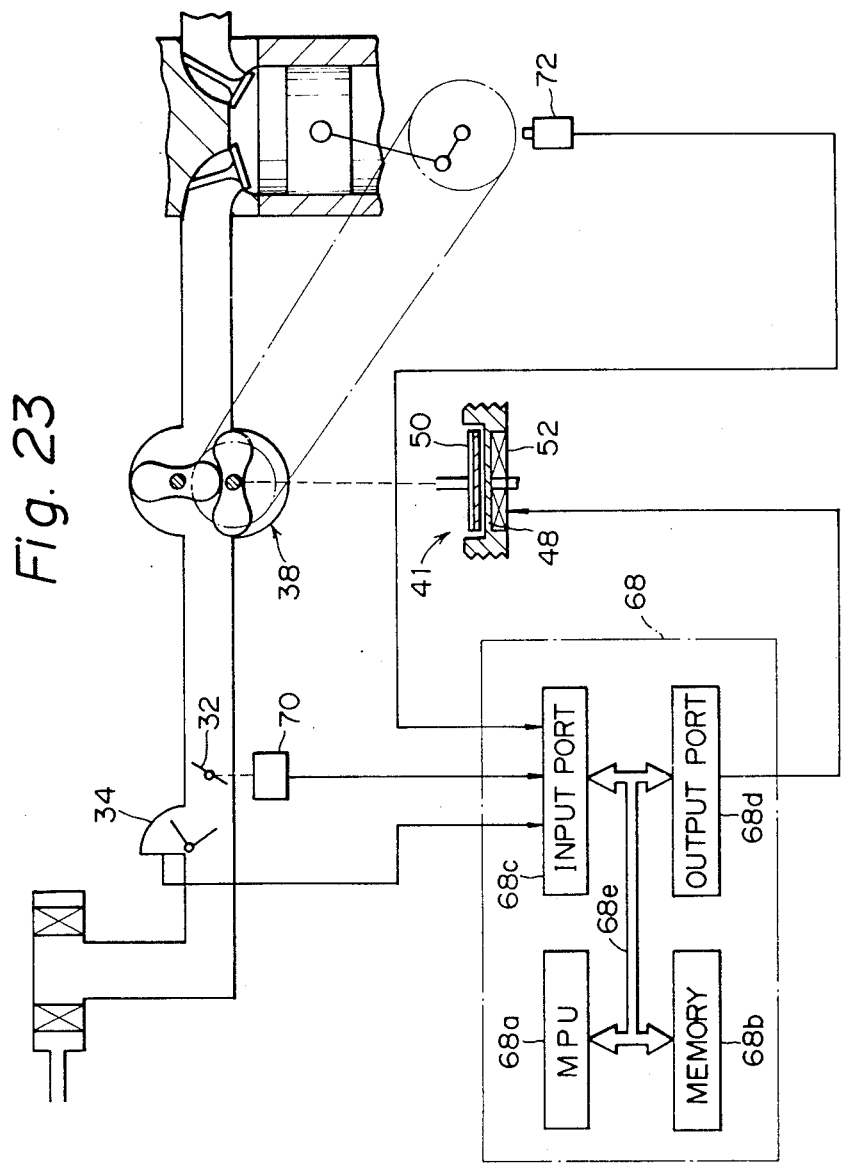

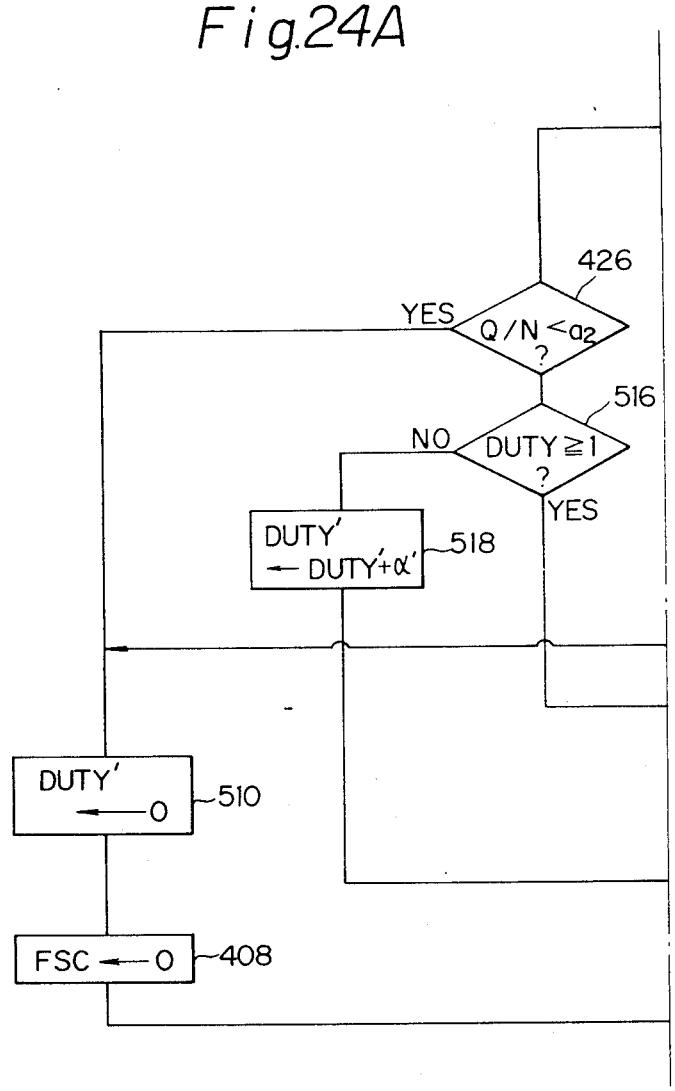

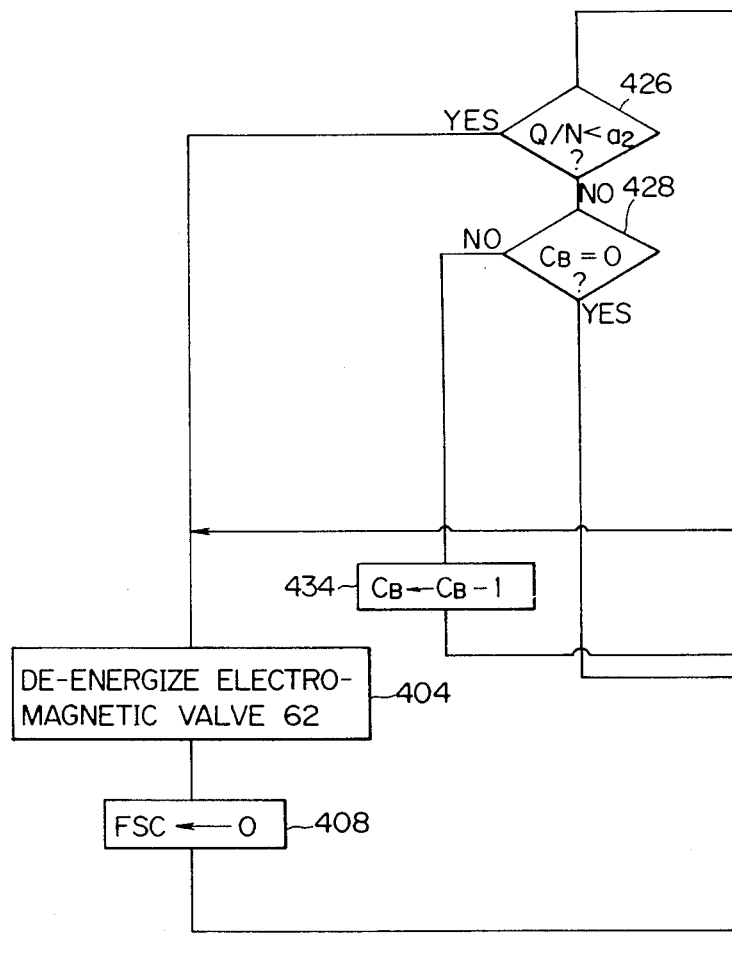

SYSTEM FOR CONTROLLING INTAKE PRESSURE IN A SUPERCHARGED INTERNAL COMBUSTION ENGINE

This is a division of application Ser. No. 862,971 filed May 14, 1986 now U.S. Pat. No. 4,766,873.

BACKGROUND OF THE INVENTION

1. Field of the Invention

The present invention relates to a system for controlling intake air pressure in an internal combustion engine provided with a mechanical supercharger operated by the crankshaft of the engine.

2. Description of the Related Art

Known in a prior art reference is an internal combustion engine provided with a mechanical supercharger connected directly or via a clutch device to the engine crankshaft. The engine rotation is transmitted directly or via the clutch to the supercharger for attaining the supercharging operation.

The supercharged engine usually requires an increased voltage for an ignition (hereinafter, ignition requirement voltage) when the engine condition is changed by an acceleration thereof. The increase in the ignition requirement voltage is very large under an acceleration condition wherein the engine is accelerated from a preceding deceleration condition with a fuel cut, since the spark plugs are cold. To obviate this difficulty, as disclosed in Japanese Unexamined Patent Publication No. 59-15626, a system has been proposed wherein the supercharger is controlled so that the supercharging effect is gradually increased when a clutch for controlling the supercharger is changed from the disengaged position to the engaged position. After a lapse of a predetermined time from the clutch position changeover, the supercharger is switched to full operation. This prior art is disadvantageous in that it has a poor response in engine power during an acceleration, since there is always an delay in the switching of the operation of the supercharger when the engine begins to accelerate.

This prior patent also suffers from another drawback in that a sharp increase in the engine torque can not be obtained when the driver has fully depressed the accelerator pedal to attain a rapid acceleration, causing an inferior driveability during such a rapid acceleration.

SUMMARY OF THE INVENTION

An object of the present invention is to provide an intake system for a supercharged internal combustion engine capable of overcoming the above-mentioned difficulties in the prior art.

According to the present invention, an intake system for a supercharged internal combustion engine is provided, comprising:

an intake line for the introduction of an amount of intake air into the engine;

a mechanically operated type supercharger arranged in the intake line;

means for connecting the supercharger to the engine for transmitting the engine rotation to the supercharger in at least an acceleration condition of the engine; detecting means for detecting a particular kind of engine acceleration condition in which it is required to gradually increase the effect of the supercharging, and means, responsive to signals from the detecting means, for controlling the supercharger so that the supercharging effect during the acceleration is weakened when the engine is under the above particular condition.

In the first embodiment, the weakening of the effect of the supercharger is attained, when the engine is accelerated from a preceding deceleration condition wherein the supply of fuel is stopped, and as a result, an increase in an ignition requirement voltage is prevented, so that a stable combustion is attained.

In the second embodiment of the present invention, the control of the supercharger is attained in accordance with the degree of the acceleration, so that a weakening of the effect of the supercharger is attained when the engine is under a moderate acceleration. As a result, the full effect of the supercharger is obtained when the engine is under a rapid acceleration. Therefore, a shockless operation during the moderate acceleration as well as a good acceleration characteristic during the rapid acceleration are attained.

BRIEF DESCRIPTION OF THE DRAWINGS

FIGS. 21A and 21B are flow charts of routines attained by the control circuit in FIG. 20;

FIG. 22 is a timing chart showing the operation of the embodiment of FIG. 20;

FIG. 23 shows the construction of another embodiment of the second aspect of the present invention;

FIGS. 24A and 24B are flow charts of routines attained by the control circuit in FIG. 23;

FIGS. 27A and 27B are flow charts of routines attained by the control circuit in FIG. 26.

DESCRIPTION OF THE PREFERRED EMBODIMENTS

Figure 1:
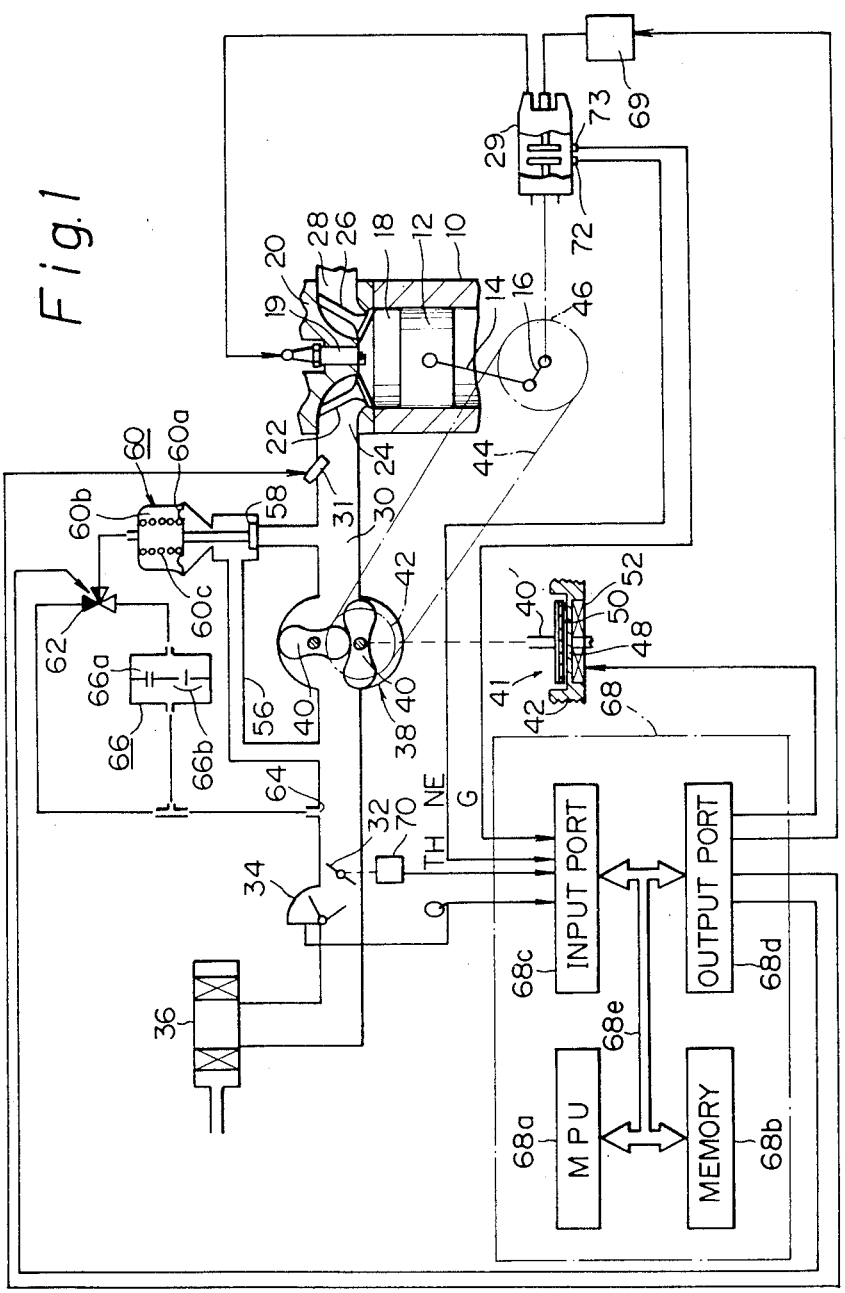
FIG. 1 shows a general schematic view of a first embodiment of the present invention.

In FIG. 1 showing a first embodiment of the present invention, reference numeral 10 designates a cylinder block, 12 a piston, 14 a connecting rod, 16 a crankshaft, 18 a combustion chamber, 19 a spark plug, 20 a cylinder head, 22 an intake valve, 24 an intake port, 26 an exhaust valve, 28 an exhaust port, and 29 a distributor.

The intake port 24 is connected to an intake pipe 30 in which a fuel injector 31 and a throttle valve 32 are arranged. An air flow meter 34 and an air cleaner 36 are located upstream of the throttle valve 32, and a mechanical type supercharger 38 is located downstream from the throttle valve 32. The mechanical supercharger 38 is, in this embodiment, constructed from a Roots pump having a pair of rotors 40 which rotate with respect to a housing while maintaining a small clearance between the rotors 40 and the housing, so that a compression operation of the intake air from the throttle valve 32 is attained. Arranged on a shaft 40' of one of the rotors 40 is a clutch device 41 provided with a pulley 42 which is kinematically connected to a pulley 46 on the crankshaft 16. The clutch device 41 is comprised by a pair of friction plates 48 and 50, and a solenoid 52. The solenoid 52 is selectively energized in order to control the engagement of the friction plates 48 and 50.

A by-pass passageway 56 is connected to the intake pipe 30 so that the passageway 56 by-passes the supercharger. The by-pass passageway 56 is connected at one end to the intake pipe 30 between the throttle valve 32 and the supercharger 38, and connected at the other end to the intake pipe 30 between the supercharger 38 and the fuel injector 31. A by-pass control valve 58 is arranged in the by-pass passageway 56. The by-pass control valve 58 is operated by a diaphragm actuator 60 having a diaphragm 60a connected to the control valve 58. A diaphragm chamber 60b is formed on one side of the diaphragm 60a, and a spring 60c is arranged in the chamber 60b to urge the diaphragm 60a so that the control valve 58 assumes a closed position, thereby closing the by-pass passageway 56. A switching valve 62 is provided for switching between a condition wherein the diaphragm chamber 60b is directly connected to an intake pressure taking-out port 64 located downstream from the throttle valve 32, and a condition wherein the diaphragm chamber 60b is connected to the intake pressure taking-out port 64 by way of a pressure transmission delay valve 66. The switching valve 62 is constructed from a electro-magnetic valve. When the valve 62 is de-energized, the diaphragm chamber 60b is connected to the port 64 by way of the pressure transmission delay device 66, which is comprised by an orifice 66a and a check valve 66b in parallel with each other. When the pressure of the port 64 is at a pressure near to an atmospheric pressure, which occurs during a wide open condition of the throttle valve 32, the check valve 66b is closed while the diaphragm chamber 60b is opened to the port 64 by way of the orifice 66a, causing the pressure in the diaphragm chamber 60b to be gradually increased to a level at which it is the same as the pressure at the taking-out port 64. When the pressure at the taking-out port 64 is at a vacuum pressure, which occurs during a partially opened condition of the throttle valve 32, the check valve 66b is opened. Thus, the pressure at the diaphragm chamber 60b is quickly brought to the level at which it is the same as the vacuum pressure at the taking-out port 64. When the switching valve 62 is energized, the diaphragm chamber 60b is directly connected to the intake pressure taking-out port 64.

Reference numeral 68 designates a control circuit for controlling the operation of the electro-magnetic clutch 41 and the electro-magnetic switching valve 62. The control circuit 68 is constructed as a microcomputer system which is comprised by a micro-processing unit (MPU) 68a, a memory 68b, an input port 68c, an output port 68d, and a bus 68e, by which these parts are interconnected. Various sensors are connected to the input port 68c in order to introduce various engine operation condition signals. An electric signal related to an amount of air Q introduced into the engine is obtained from the air flow meter 34. A throttle sensor 70 is connected to the throttle valve 32 for producing an electric signal indicating the degree of opening TH of the throttle valve 32. Further, a pair of crank angle sensors 72 and 73 are arranged in the distributor 29. The first crank angle sensor 72 issues a pulse signal at every crank angle (CA) of the crankshaft 16 of 30 degrees, which signal is used to obtain the engine rotational speed Ne. This 30 degrees CA signal is also used for starting crank angle interruption routines. The second crank angle sensor 73 issues a pulse signal G at every crank angle of 720 degrees CA, which signal is used as a reference signal.

The output port 68d is connected to the fuel injector 31, the solenoid 52 of the clutch 41 and the electro-magnetic valve 62. As will be described later, the memory 68b is provided with programs for attaining fuel injection control, a control of the clutch 41 for operating the mechanical supercharger 38, a control of the electro-magnetic valve 62 for attaining control of the condition of the supercharger 38, and other operations, such as control of an ignitor 69 which is connected to the desired spark plugs 19 via the distributor 29 and which will not be described in a detail since they are not directly related to the present invention.

Now the operation of the control circuit will be explained with reference to the flow charts of FIGS. 2 to 5, which schematically illustrate the programs stored in the memory 68b.

Figure 2:
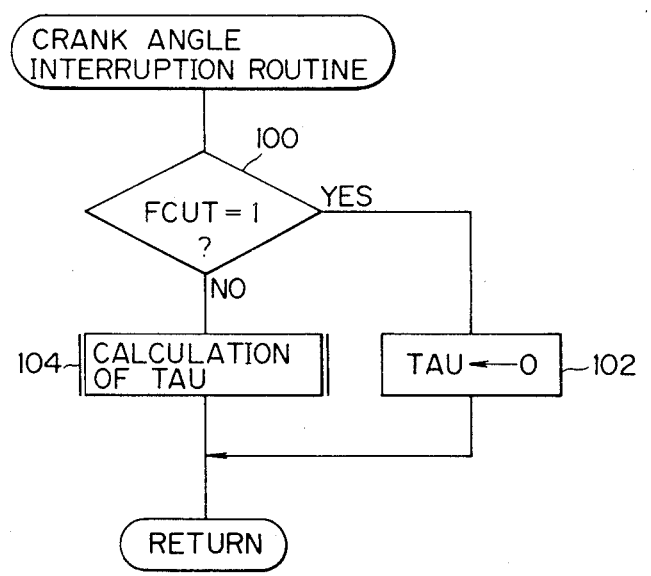
FIGS. 2 through 5 show flow charts of the routines attained by the control circuit in FIG. 1.

FIG. 2 is a flow chart for attaining a fuel injection. This routine is commenced at a predetermined degree of the crank angle of the crankshaft 16 detected by the first and second crank angle sensors 72 and 73. At point 100 it is judged whether a fuel-cut flag is "1". As will be described later, this flag FCUT is set when the engine is changed to the fuel-cut condition and is reset when the engine is returned to the non-fuel-cut condition. When the flag FCUT is "1", the program goes from point 100 to point 102, where a zero value is moved to a memory area storing the data of the fuel injection amount TAU, so that the fuel injection is stopped. When the flag FCUT is "0", the program goes to point 104, where the fuel injection amount TAU is calculated in accordance with an engine load calculated from a parameter, such as the ratio of intake air amount to engine speed, Q/Ne, and engine speed Ne. The fuel injector 31 is operated for a predetermined period so that the calculated amount of fuel TAU is injected from the injector 31.

Figure 3:
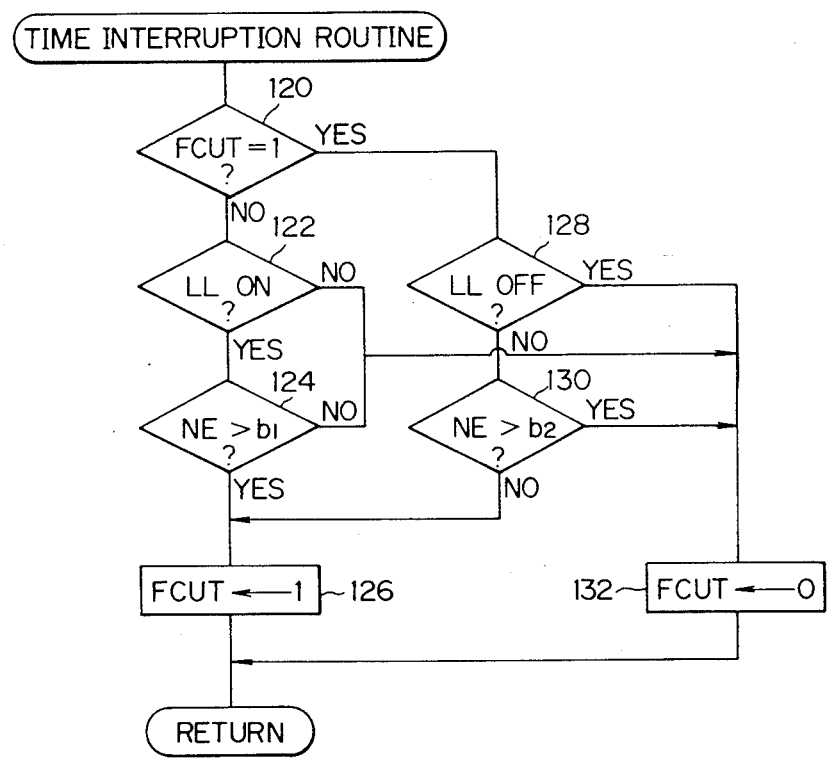

FIG. 3 is a routine for controlling the fuel-cut flag FCUT. This routine is carried out at a predetermined time period, for example, 4 msec. At point 120 it is judged whether the flag FCUT is "1". If the flag FCUT is "1", the program goes from point 120 to point 122 where it is judged whether the throttle valve idle contact LL provided in the throttle sensor 70 is made ON. The LL contact is made ON when the throttle valve 32 is in an idling position. Thus, the program goes from point 22 to point 124, where it is judged whether the engine speed Ne is larger than a predetermined value $b_1$, such as 2000 rpm. If the judgement is "yes" at point 124, the engine is switched to a fuel-cut condition. The program then proceeds to point 126, where the flag FCUT is set. When the idle contact LL is made OFF or when the engine speed Ne is higher than the predetermined value $b_1$, the program from point 122 or 124 goes to point 132, where the reset condition of the fuel-cut flag FCUT is maintained.

When the fuel cut flag is set at point 120, the program flows to point 128, where it is judged whether the throttle valve idle contact LL is made OFF. At the following point 130, it is judged whether the engine speed is higher than a predetermined value $b_2$, such as 1500 rpm. If the judgement is "yes" at one of the points 128 and 130, the engine is switched to a non-fuel-cut condition. Thus, the program flows to the point 132 where the flag FCUT is reset. If the judgement is "no" at both points 128 and 130, the engine is maintained in the fuel-cut condition. Thus, the program flows to point 126 where the fuel cut flag FCUT is maintained at "1".

Figure 4:
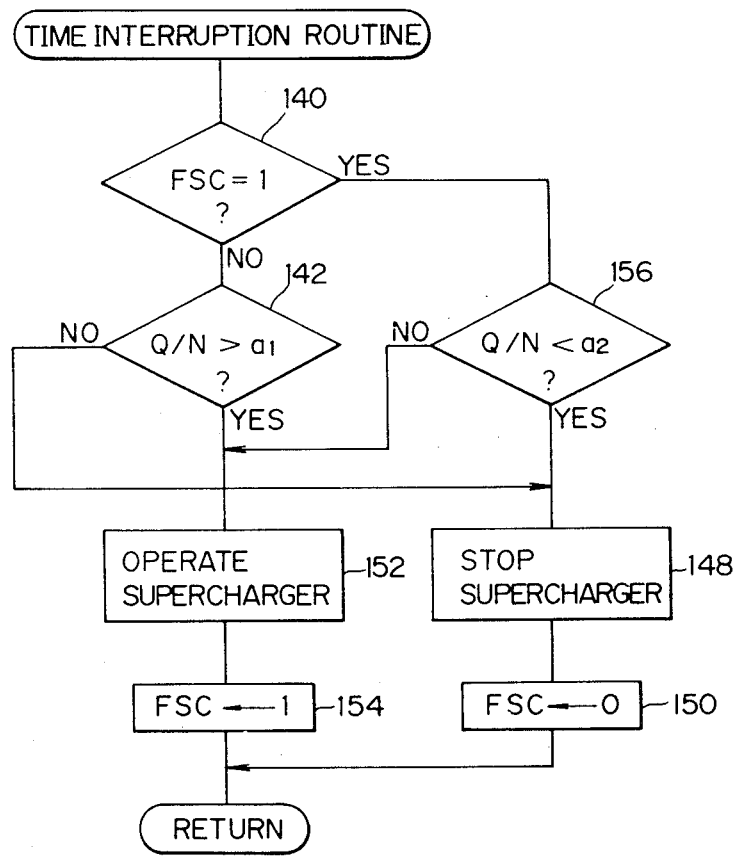

FIG. 4 shows a routine for attaining the control of the supercharger 38. This routine is also executed for a predetermined time interval. At point 140, it is judged whether a supercharger operating flag FSC is "1". This flag FSC is made to be "1" when the engine is switched to a state wherein the supercharger 38 is to be operated, and the flag FSC is made to be "0" when the engine is to be switched to a state wherein the supercharger 38 is to be stopped (see FIG. 6-(d)). When the flag FSC is "0", the program flows from point 140 to point 142, where it is judged whether the intake air amount to engine speed ratio Q/Ne is larger than a predetermined value $a_1$. When the ratio Q/Ne is lower than this value $a_1$, the program flows from point 142 to point 148, where a low output signal is issued from the output port 68$d$ to the solenoid 52 of the clutch 41, causing the clutch friction plates 48 and 50 to be disengaged. Thus, no rotation is transmitted from the crankshaft 16 to the supercharger 38. Thus, a substantial amount of intake air is introduced into the combustion chambers 18 via the by-pass passageway 56, rather than via the supercharger 38. At point 150, the flag FSC is reset.

When the ratio Q/Ne is higher than the value $a_1$, the program flows from point 142 to point 152, where a high level signal is issued to the solenoid 52 of the clutch 41, causing the clutch 41 to be engaged. Thus rotation of the engine is transmitted to the supercharger 38. At point 154, the flag FSC is set.

It is assumed that the time interruption routine enters into calculation while maintaining the high load experienced by the engine, the routine from point 140 goes to point 156, since the flag FSC is now "1". At point 156, it is judged whether the intake amount to engine speed ratio Q/N is smaller than a predetermined value $a_2$, which is smaller than $a_1$ at point 142, so as to provide a hysteresis operation of the supercharger 38 to prevent chattering. When the result of the judgement at point 156 is that engine speed is not decreased below $a_2$, the routine goes to point 152 where the supercharger is allowed to continue to operate.

When Q/N is decreased below $a_2$, the program flows from points 140 and 156 to point 148, to attain a low load operation whereby the clutch 41 is disengaged, and thus cancel the operation of the supercharger 38.

Figure 5:
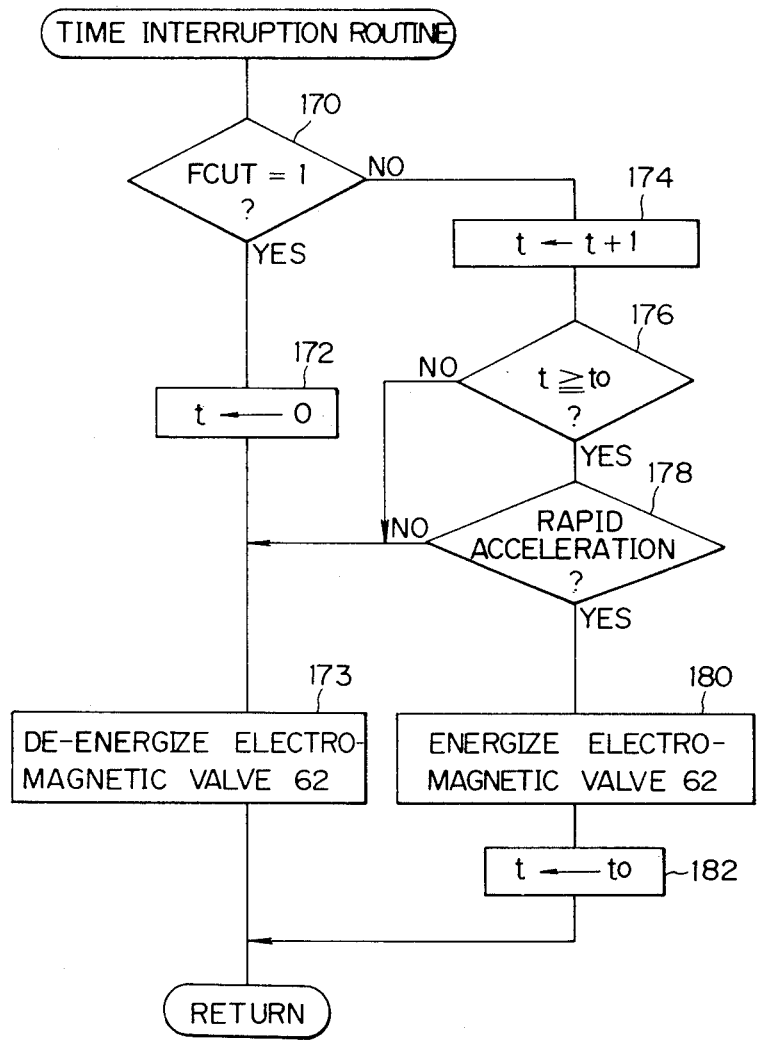

FIG. 5 shows a routine for operating the switching valve 62, which routine is also effected at a predetermined time interval. At point 170, it is judged if the fuel cut flag FCUT is "1". When the engine is under the fuel-cut operation, the program goes to point 172 where a timer counter t for counting the time after the switching of an engine state from a fuel-cut condition to a fuel supply condition, is cleared. At the following point 173, the switching valve 62 is de-energized so that the diaphragm chamber 60$b$ of the actuator 60 is opened, via the pressure delay device 66, to the pressure taking-out port 64.

When the engine is changed to the fuel supply state, the flag FCUT is "0" at point 170. Thus, the program goes to point 174 and the timer t is incremented. At the following point 176, it is judged if the value of the counter t has reached the value $t_0$. If the time has not yet reached the value $t_0$, the program goes to point 173 to maintain the switching valve 62, in a de-energized condition.

If a time corresponding to the value $t_0$ has elapsed after the switching to the fuel supply condition, the program from point 176 flows to point 178, where it is judged if the engine is under a rapid acceleration condition. This judgement is effected by any known manner, for example, by judging whether the degree of change of the signal from the throttle sensor 32 corresponding to the opening of the throttle valve is larger than a predetermined positive value.

As is clear from the above, before the lapse of the predetermined time corresponding to the value $t_0$, irrespective of the degree of acceleration, the program goes to point 173 to de-energize the switching valve 62 and connect the chamber 60$b$ with the pressure port 64 via the delay device 66 to permit the by-pass control valve 58 to be gradually closed. During the acceleration, the pressure at the pressure taking-out port 64 is substantially under the atmospheric pressure due to the wide opening of the throttle valve 32. The atmospheric pressure at the port 64 permits the check valve 66$b$ to be closed, so that the orifice 66$a$ allows the pressure 60$b$ to be increased, at a limited rate, to the atmospheric pressure. Thus, the diaphragm 60$a$ moves gradually downward to close the by-pass control valve 60 at a controlled rate. This means that a wide opening of the degree of the by-pass passageway 56 is obtained at the beginning of the acceleration. The degree of the opening of the by-pass passageway 56 is then gradually decreased, as the time is lapsed, toward the fully closed position. Since the by-pass passageway 56 is gradually closed after the beginning of an acceleration from the fuel-cut condition, irrespective of the degree of acceleration, the pressure in the combustion chamber 18 is moderately increased irrespective of the increase in the rotational speed of the supercharger 38 by the engagement of the clutch 41. This moderate increase in the pressure in the combustion chamber 18 prevents a large increase in the ignition requirement voltage, and thus a stable ignition can be obtained without misfiring.

When a time corresponding to the value $t_0$ has lapsed from the switching to the fuel supply condition, the program from the point 176 flows to point 178 for judging if the engine is under the rapid acceleration condition. If the result is "yes" at point 178, the program goes to point 180 where a signal is issued from the output port 68d to energize the electro-magnetic switching valve 62, so that the diaphragm chamber 60b of the actuator 60 is directly connected to the pressure taking-out port 64. Therefore, the diaphragm chamber 69b, instantly assumes a pressure equal to the pressure at the port 64, which is substantially the atmospheric air pressure, allowing the spring 60c to move the by-pass control valve 58 downwardly to assume the closed position. As a result, all of the amount of air is introduced into the combustion chamber 18, via the supercharger, and a quick increase in the engine torque is obtained. At point 182, the value $t_0$ is moved to the counter t. In short, the by-pass control valve 58 is rapidly closed when the engine has experienced the rapid acceleration and, therefore, the driver can obtain a good feeling for the acceleration.

Figure 6:
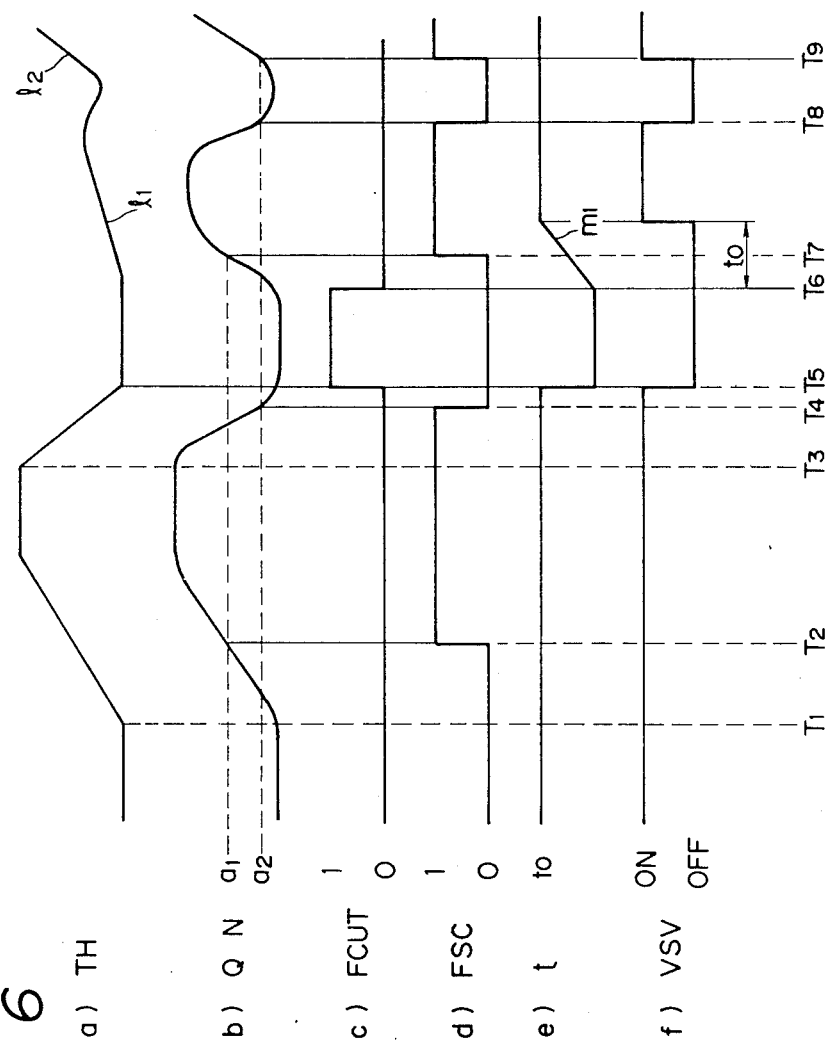
FIG. 6 shows a timing chart explaining the operation of the control circuit of FIG. 1.

FIG. 6 is a timing chart showing the operation of the first embodiment described above. At time $T_1$ the accelerator pedal is depressed to open the throttle valve 32. At time $T_2$, the intake air amount to engine speed ratio Q/N becomes larger than the threshold level $a_1$, causing the clutch 41 to be engaged for rotating the supercharger 38 (flag FSC=1). At time $T_3$, the accelerator pedal is released for closing the throttle valve 32 for attaining deceleration. At time $T_4$ the ratio Q/N becomes smaller than the threshold level $a_2$, causing the clutch 41 to be disengaged for stopping the supercharger 38 (the flag FSC=0). During the deceleration, the fuel-cut operation in FIG. 3 is carried out, and the fuel-cut flag FCUT is set at time $T_5$. At time $T_6$ the engine enters into a fuel supply condition, and the fuel-cut flag FCUT is reset, and therefore, the counter t begins to increment as shown by a line $m_1$ in FIG. 6-(e). The accelerator pedal is again depressed to open the throttle valve 32 as shown by line $l_1$ in FIG. 6-(a), so that the value Q/N exceeds the threshold value $a_1$ for engaging the supercharger operating clutch 41 at time $T_7$. However, since the counter t is counting-up toward the value of $t_0$, the electro-magnetic switching valve 62 is maintained in a de-energized condition, irrespective of the degree of acceleration. Thus, the diaphragm chamber 60b of the by-pass control valve 58 is connected to the pressure taking-out port 64 via the pressure delay device 60, so that the by-pass passageway 56 is gradually closed to obtain a "mild" increase in the supercharger effect just after the fuel supply is recovered from the fuel-cut condition during deceleration.

At time $T_8$, the ratio Q/N is decreased below the level $a_2$ to stop the supercharger. Again, at time $T_9$, the throttle valve is opened as shown by a line $l_2$ so that the ratio Q/N exceeds the threshold value $a_1$ at time $T_9$ for attaining the rapid acceleration without experiencing a preceding fuel-cut. In this case, the electro-magnetic switching valve 62 is instantly energized upon the engagement of the supercharger operating clutch, because of the fixed counter value $t_0$, so that a quick increase in the supercharging effect is obtained to obtain a sharp increase in torque that matches the rapid acceleration.

As a modification of the first embodiment, step 178 in FIG. 5 can be eliminated. In this case, the switching valve 62 is always energized if the predetermined time has lapsed from the recovery of the fuel supply from the fuel-cut condition, so that the diaphragm chamber 60b is directly connected to the pressure taking-out port 64, for cancelling the delayed operation of the by-pass control valve 58 irrespective of the degree of acceleration.

Figure 7:
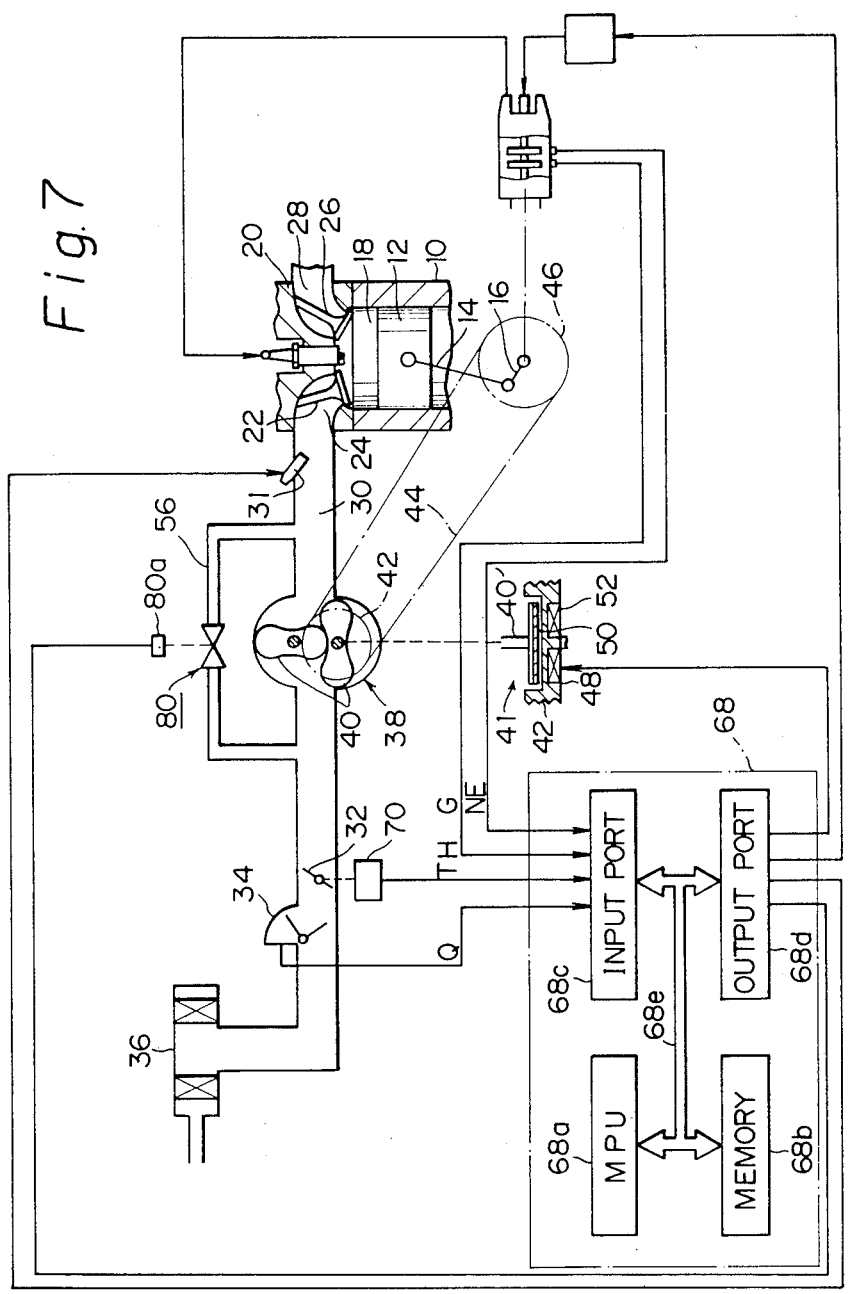
FIG. 7 shows a general schematic view of a second embodiment of the present invention.
Figure 8:
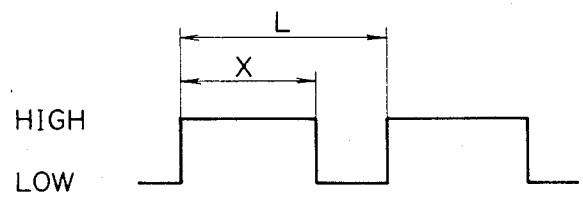
FIG. 8 shows a timing chart indicating the pulse signals for operating a by-pass control valve.
Figure 9:
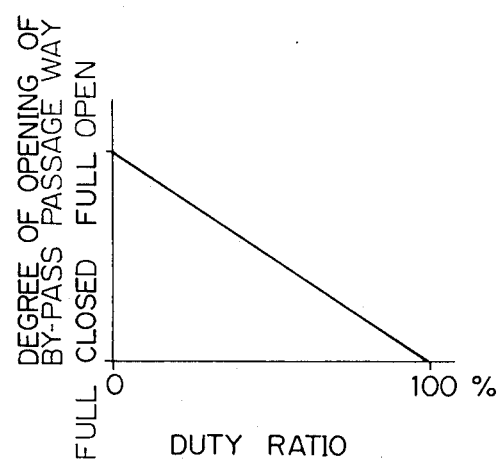
FIG. 9 shows a graph illustrating a relationship between duty ratio and degree of opening of the by-pass control valve.
Figure 10:
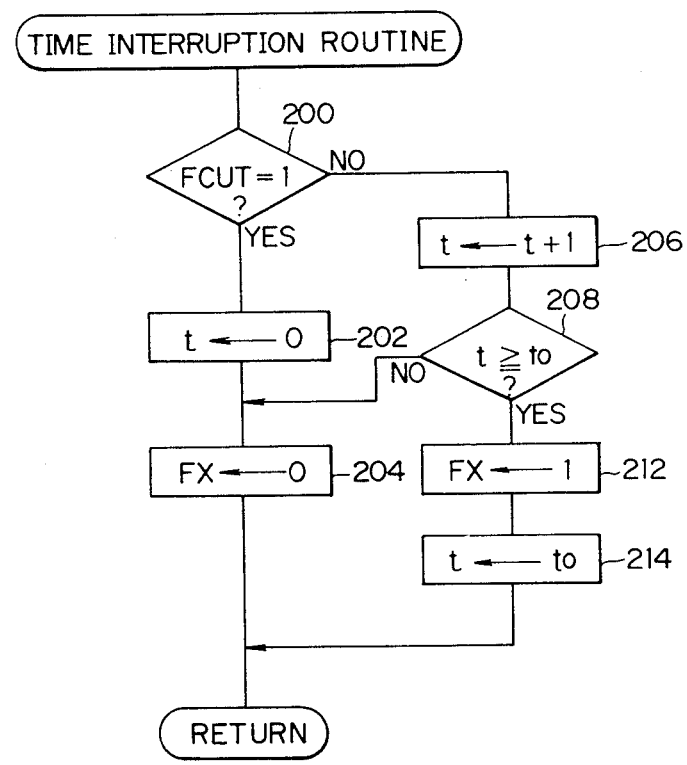
FIGS. 10 and 11 show flow charts of the routines attained by the control circuit in FIG. 7.
Figure 11:
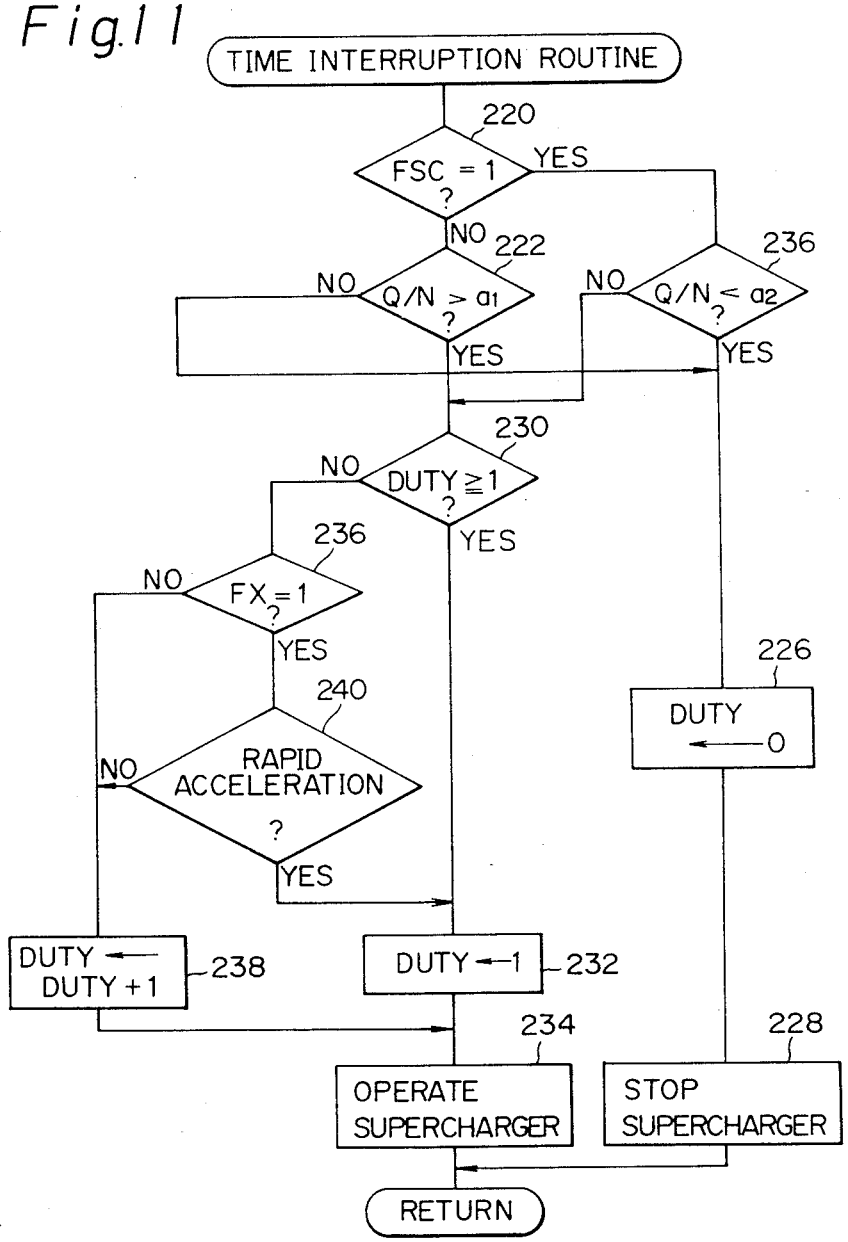

FIG. 7 shows a construction of a second embodiment. In place of the by-pass control valve 60, the diaphragm actuator 60, the electro-magnetic pressure switching valve 62, and the pressure delay device 66 in FIG. 1, only an electro-magnetic by-pass control valve 80 is provided, which valve is arranged on the by-pass passageway 56. The by-pass control valve 80 is provided with an electro-magnetic actuator device 80a connected to the output port 68d of the control circuit 68. The control circuit 68 issues pulse signals having a calculated duty ratio for controlling the desired degree of opening of the by-pass passageway 56. The duty ratio means, in one cycle of the operating signal for the by-pass valve 80 as shown in FIG. 8, a ratio of time of duration of high level, X to a time of duration of one cycle, L. When the duty ratio is 0%, the by-pass passage 56 is fully opened, while when the duty ratio is 100%, the by-pass passageway 56 is fully closed, as shown in FIG. 9. This means that, in accordance with an increase in the duty ratio, the by-pass amount of air is decreased. The control circuit 68 issues, in accordance with the engine operating condition, signals of the desired duty ratio directed to the clutch 41 for attaining the control of the supercharger 38, as well as to the actuator 80a for attaining the control of the by-pass. FIGS. 10 and 11 show flow charts of the programs stored in the memory 68b for attaining the operation in the second embodiment.

FIG. 10 shows a routine for controlling a flag FX indicating the lapse of a predetermined time after the switching to the fuel supply condition from the fuel-cut condition. During the fuel-cut condition, the flag FCUT is made "1" by the same routine as in FIG. 3, and therefore, the program goes from point 200 to point 202 where the timer counter t is cleared. At the following point 204 the flag FX is reset.

When the engine condition is transferred to the fuel supply condition from the fuel-cut condition, since the flag FCUT=1, the program goes to point 206 where the counter t is incremented. At point 208 it is judged if the value of the timer counter t is larger than a predetermined value $t_0$. When a predetermined time corresponding to the value $t_0$ has not yet lapsed from the switching to the fuel supply condition, the program goes to point 204 to maintain the reset condition of the flag FX. When the predetermined time has lapsed, the program goes from point 208 to point 212, where the flag FX is set. At point 214, the value $t_0$ is moved to the timer counter t. If the judgement at the point 208 is No, the value of the counter t has not yet reached $t_0$ and thus the program goes to point 204 for maintaining the reset of the flag FX.

FIG. 11 shows a flow chart illustrating the routine for attaining the by-pass control as well as the supercharger control. During the low load condition, the routine goes, via points 220 and 222, to point 226 where 0 is moved to the memory area for storing the data of the duty ratio DUTY in the pulse signals for operating the by-pass control valve 80. This pulse signal is issued from the output port 68d to the electro-magnetic actuator 80a, so that the by-pass control valve 80 assumes the fully open condition. At the following point 228, the clutch 41 is disengaged to stop the rotation of the supercharger 38.

When the engine is under the high load or accelerating operation, the routine goes, via points 220 and 222, to point 230 where it is judged if the duty ratio DUTY is equal to or larger than 1.0. If the judgement is "Yes" at point 230, the routine goes to point 232 where 1 is moved to the memory area for storing the data of the duty ratio DUTY in the pulse signals for operating the by-pass valve 80. When the duty ratio DUTY has not yet reached the value of 1, then the program goes to point 236 where it is judged whether the flag FX is 1. A "No" result is obtained during a short period when the engine is accelerated after experienced the preceding fuel-cut condition. In this case, the program goes to point 238, where the duty ratio DUTY is incremented. Therefore, the degree of the opening of the by-pass control valve 80 is gradually increased.

When the flag FX is 1, this means that the predetermined time $t_0$ has lapsed from the beginning of the acceleration after the preceding fuel-cut condition. In this case, the program goes from point 236 to point 240, where it is judged if the acceleration is rapid. When the engine is gradually accelerated, the routine flows from point 240 to point 238, for incrementing the duty ratio DUTY, so that the by-pass control is gradually closed. Contrary to this, when the engine is under a rapid acceleration, the program goes from point 232 to point 234 wherein the duty ratio DUTY is made 1, so that the by-pass control valve 80 is instantly moved to its fully closed position, in order to obtain the full rotation of the supercharger 38. As a result, a sharp increase in the engine torque can be obtained.

Figure 12:
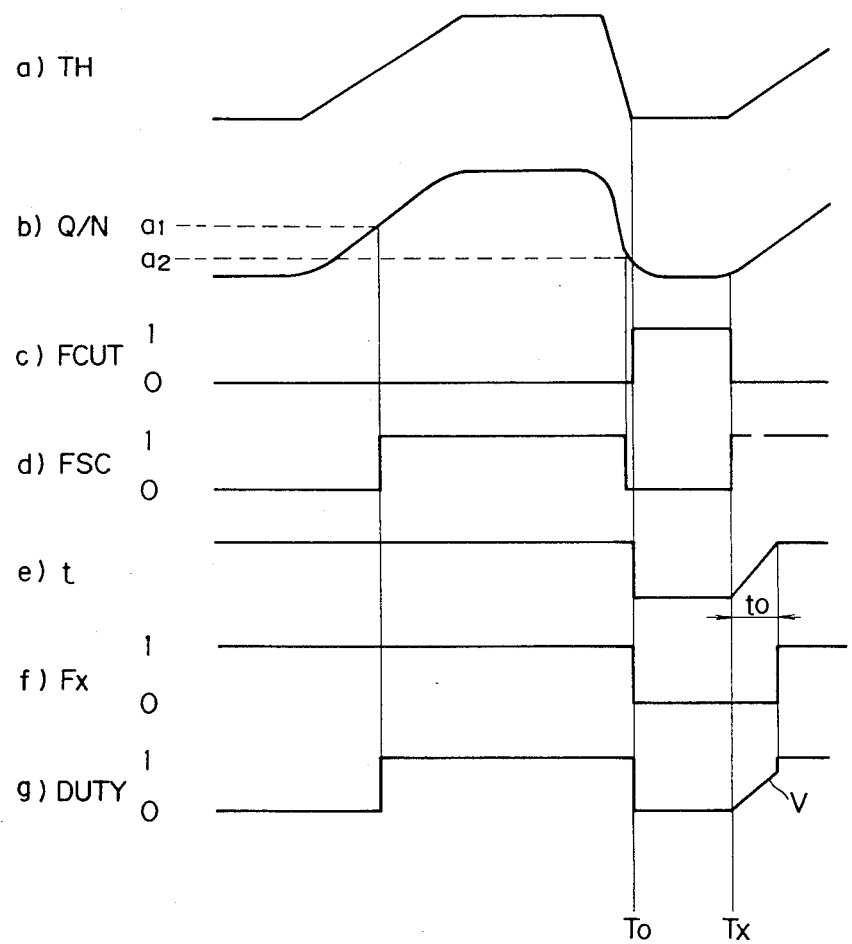
FIG. 12 shows a timing chart explaining the operation of the control circuit in FIG. 7.

FIG. 12 shows a timing chart illustrating the operation of the second embodiment attained by the routines in FIGS. 10 and 11. This is similar to FIG. 6 in the first embodiment, and therefore, only points which are different will be described. When a fuel-cut operation is carried out due to engine deceleration, the fuel-cut flag FCUT is, at time $T_0$, set as shown by FIG. 12-(c) and, at the same time, the flag FX is reset as shown by (f). The engine is moved to the fuel supply condition at time $T_x$ so that the fuel-cut flag FCUT is reset, and therefore, the timer counter t begins to be incremented as shown in FIG. 12-(e), during which the duty ratio DUTY is gradually increased as shown by a line V in FIG. 12-(g), for gradually increasing the rotational speed of the supercharger 38. Thus, an increase in the ignition voltage requirement in the ignition system is prevented, which otherwise would occur at the stage wherein the engine is accelerated from the preceding fuel-cut condition.

Figure 13:
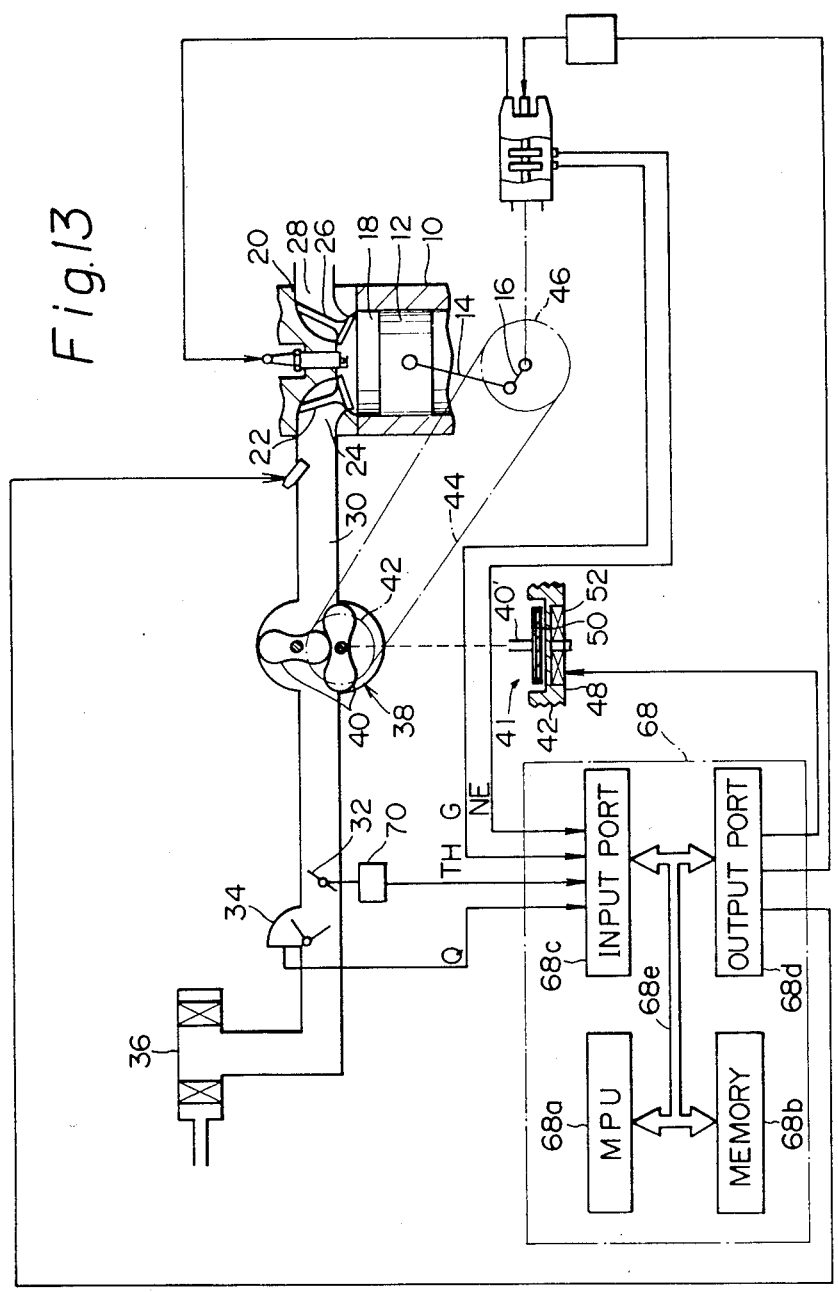
FIG. 13 shows a general schematic view of the construction of a third embodiment of the present invention.

FIG. 13 shows a third embodiment wherein, unlike the previously mentioned embodiments, a by-pass means is not provided. In order to control the supercharging effect, the rate of engagement of the clutch device 41 is controlled in accordance with the degree of acceleration of the engine, for attaining the object of the present invention. The output port 68d issues pulse signals directed to the solenoid 52 of the clutch device 41 and having calculated a duty ratio DUTY' to obtain a desired rate of engagement of the clutch device 41. The duty ratio DUTY' of "0" means the full release of the clutch 41, while the duty ratio of "1" means the full engagement of the clutch 41. A partial sliding occurs in the clutch device at the value of the duty ratio between 0 and 1.

Figure 14:
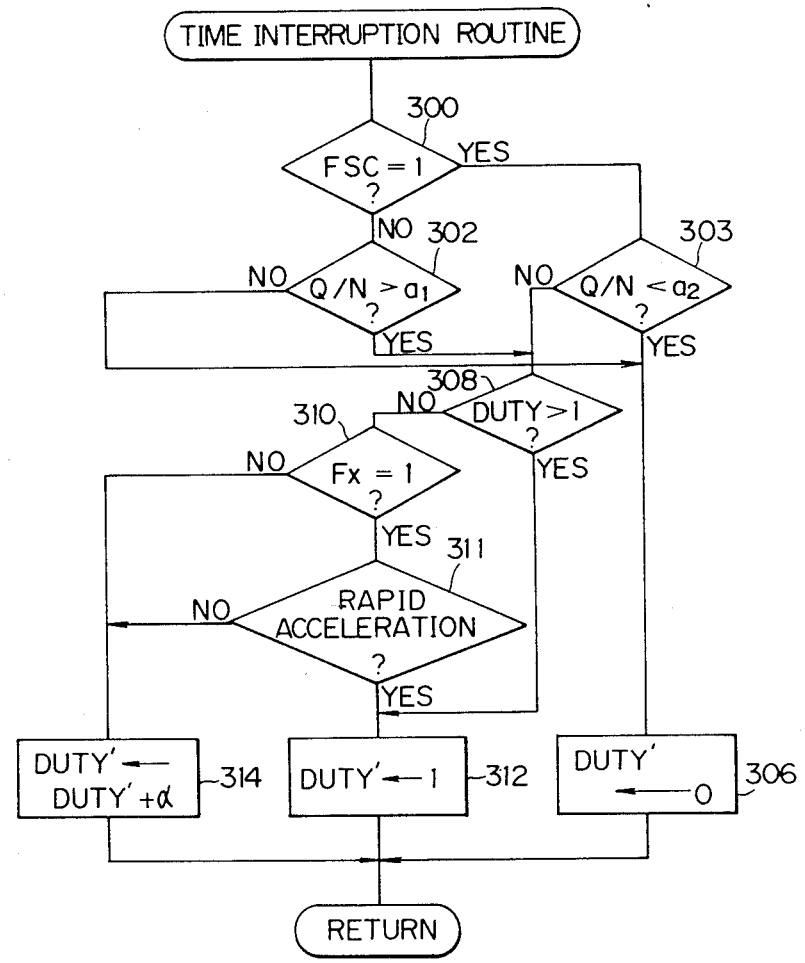
FIG. 14 shows a flow chart of a routine attained by the control circuit in FIG. 13.

FIG. 14 shows a flow chart for attaining the control of the clutch. During the low load condition, the routine goes, via points 300 and 302, to point 306, where the pulse signal of duty ratio DUTY' of "0" is directed to the solenoid 52, so that the friction plates 50 and 52 are fully detached for preventing operation of the supercharger 38.

The third embodiment is provided with the routine for controlling the flag FX, which is the same as the routine in FIG. 10. When the engine is rapidly accelerated after experiencing a preceding fuel-cut operation, the routine flows, via points 300, 302, 308, 310 and 311, to point 312, where the pulse signals of duty ratio DUTY' are applied to the solenoid 52 of the clutch device 41. Thus, a rapid engagement of the friction plates 50 and 52 takes place, so as to obtain a sharp increase in the rotational speed in the supercharger 38.

When the engine is accelerated from a preceding fuel-cut condition, or when the engine is gradually accelerated, the routine flows from point 310 or 311 to point 314, where the duty ratio DUTY' in the pulse signals is incremented by $\alpha$. As a result, as the routine of FIG. 14 is further repeated, the degree of engagement of the friction members 50 and 52 of the clutch device 41 is further increased. Thus, the supercharging effect is gradually increased as the value of the duty ratio DUTY' is increased toward the value of 1, due to the lapse of time from the beginning of the acceleration. In short, since the supercharging effect is gradually increased when the engine is accelerated from the preceding change of state to the fuel supply condition from the fuel-cut condition, a large increase in the ignition requirement voltage is prevented.

In the above mentioned first to third embodiments, the supercharger 38 is operated in accordance with detection of the intake air amount to engine speed ratio. However, various other engine operating parameters can be incorporated, as is well known to those skilled in this art.

Figure 15:
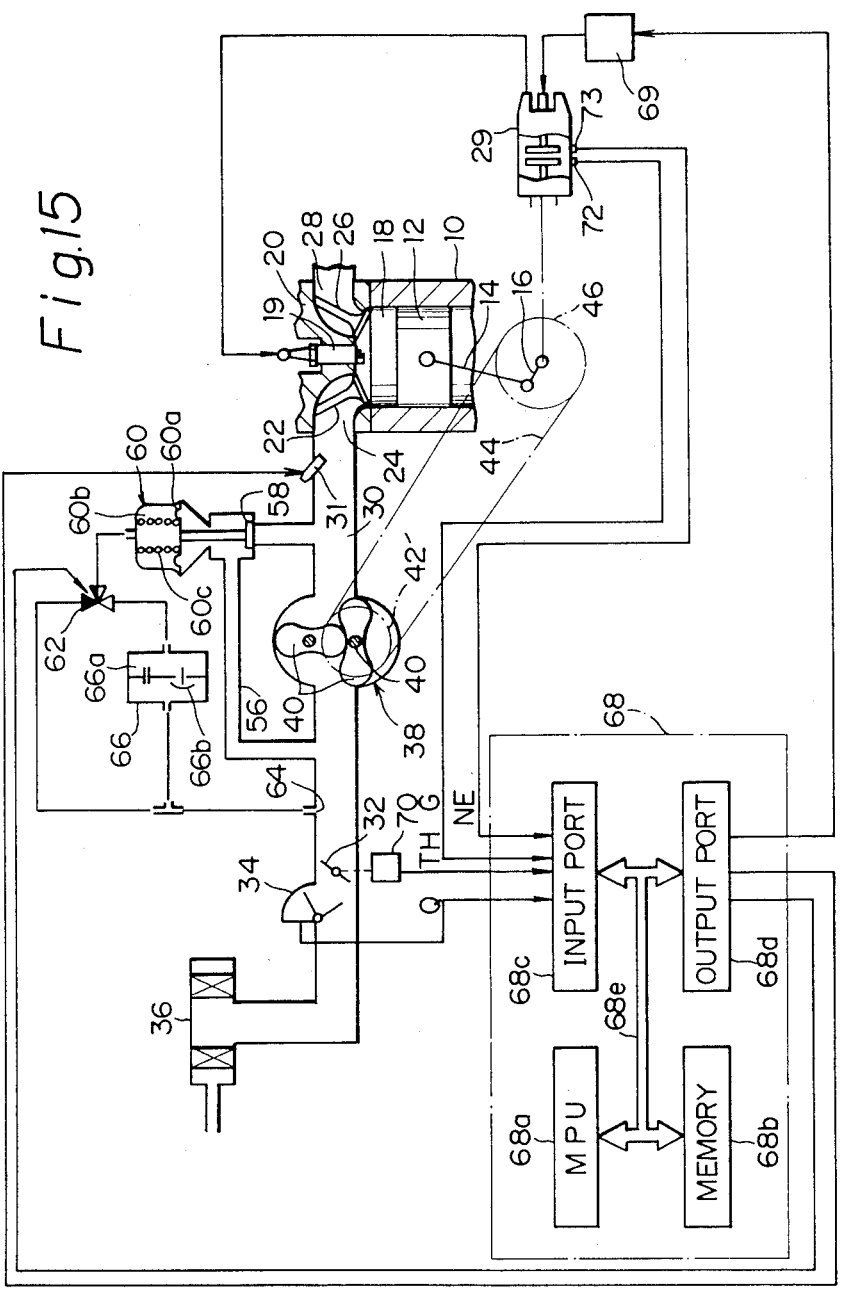
FIG. 15 shows a general schematic view of the construction of a fourth embodiment of the present invention.
Figure 16:
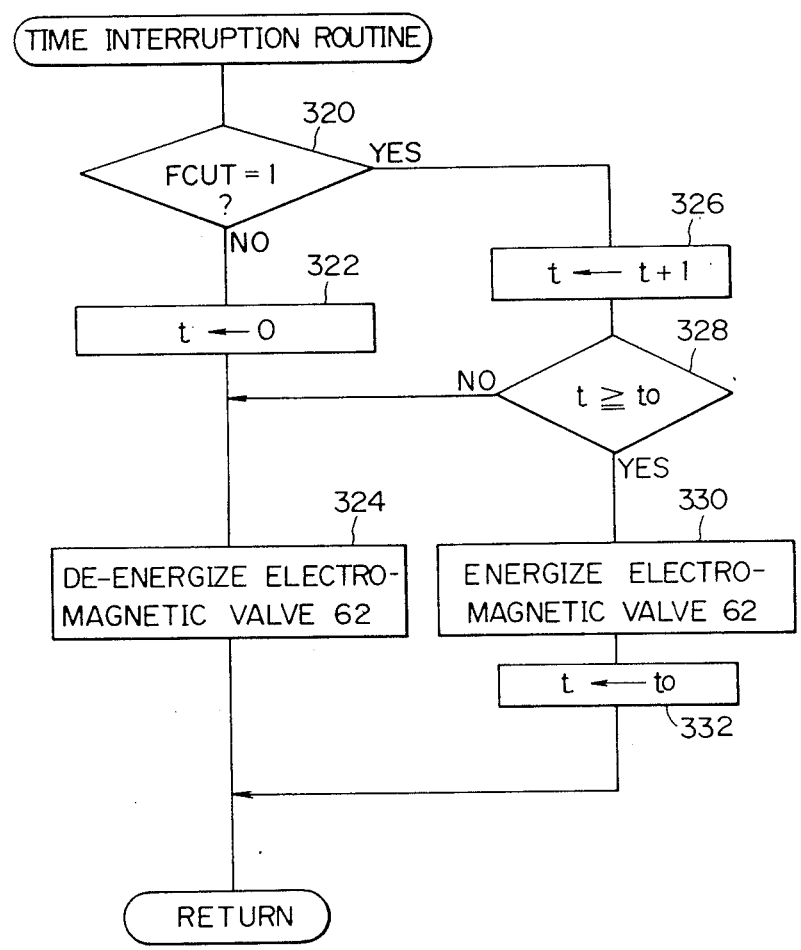
FIG. 16 shows a flow chart of a routine attained by the control circuit in FIG. 15.

FIG. 15 shows a fourth embodiment of the present invention applied to a supercharger system with no clutch device wherein the supercharger 38 is always operated by the rotation of the engine. A pulley 42' is provided on the shaft 40 of the supercharger 38. The pulley 42' is connected to the pulley on the crankshaft 16 by means of a belt 44. The other construction is substantially same as the construction of FIG. 1. FIG. 16 shows a flow chart for attaining the control of the supercharger 38 and is the same as the routine in FIG. 5 in the first embodiment, except that the step 178 in FIG. 5, for judging if the acceleration is rapid, is omitted in the routine in this fourth embodiment for simplification of the software construction.

The embodiments described above with reference to FIGS. 1 to 16 are directed to the first aspect of the invention wherein the supercharging effect is weakened when the engine is accelerated from the preceding fuel-cut condition. The second aspect of the invention described hereinafter is directed to the control of the supercharging effect in accordance with the degree of acceleration. In the prior art, Japanese Unexamined Patent Publication No. 59-15626, the engagement of the clutch for connecting the crankshaft with the supercharger is always delayed, when the engine is under acceleration. This means that the engagement of the clutch is delayed when the driver depresses the accelerator pedal deeply and rapidly. Thus, the intended sharp acceleration becomes impossible, causing the driver to suffer a poor driveability. The second aspect of the present invention is directed to a solution of that difficulty.

Figure 17:
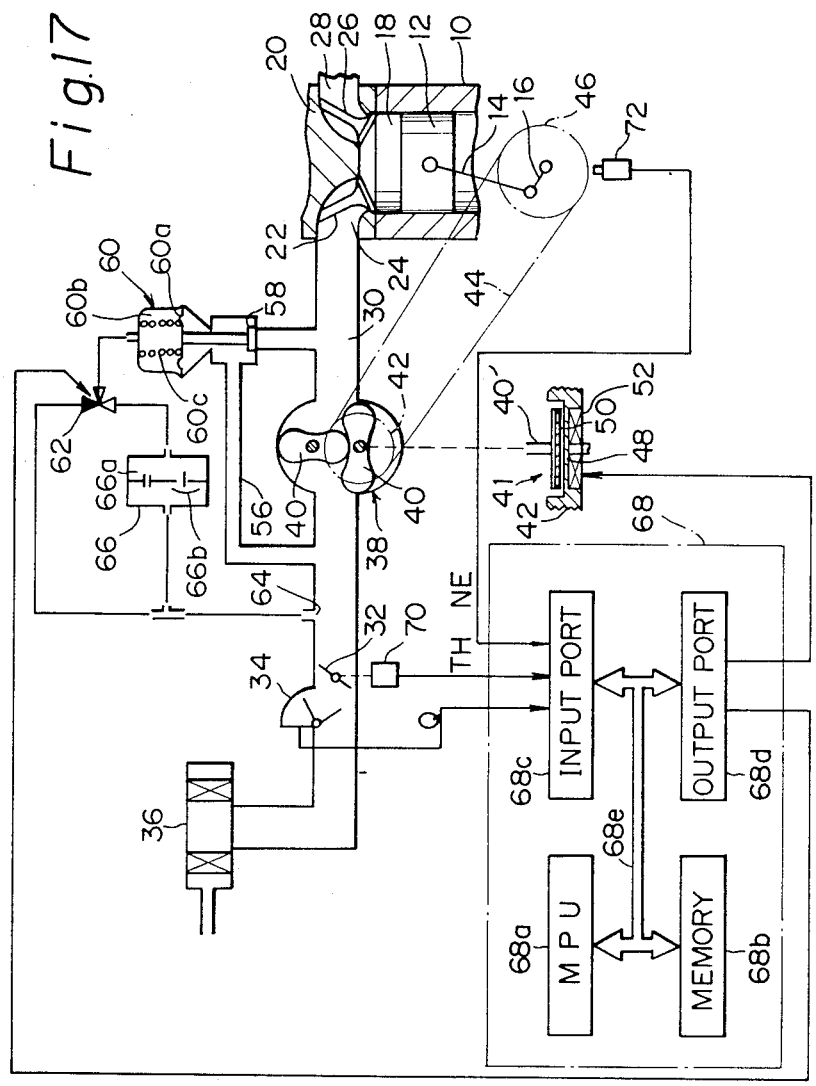
FIG. 17 shows a general schematic view of another embodiment of the supercharged internal combustion engine of the present invention, where the degree of the supercharging is controlled in accordance with the degree of acceleration.
Figures 18, 18A:
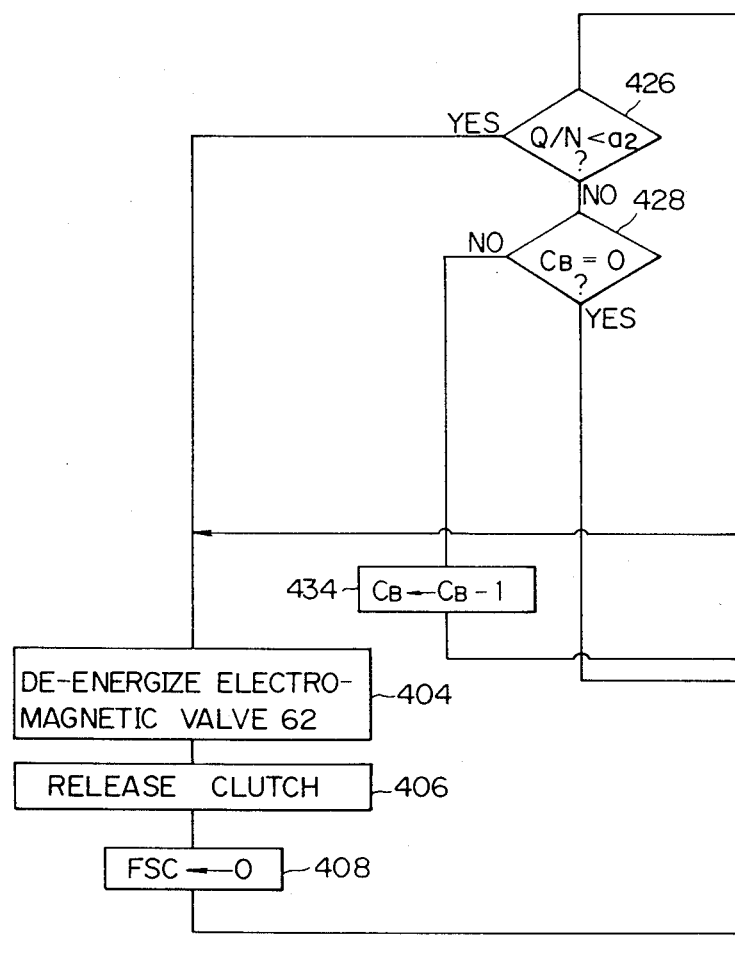
FIGS. 18A and 18B are flow charts of routines attained by a control circuit in FIG. 17.
Figure 18B:
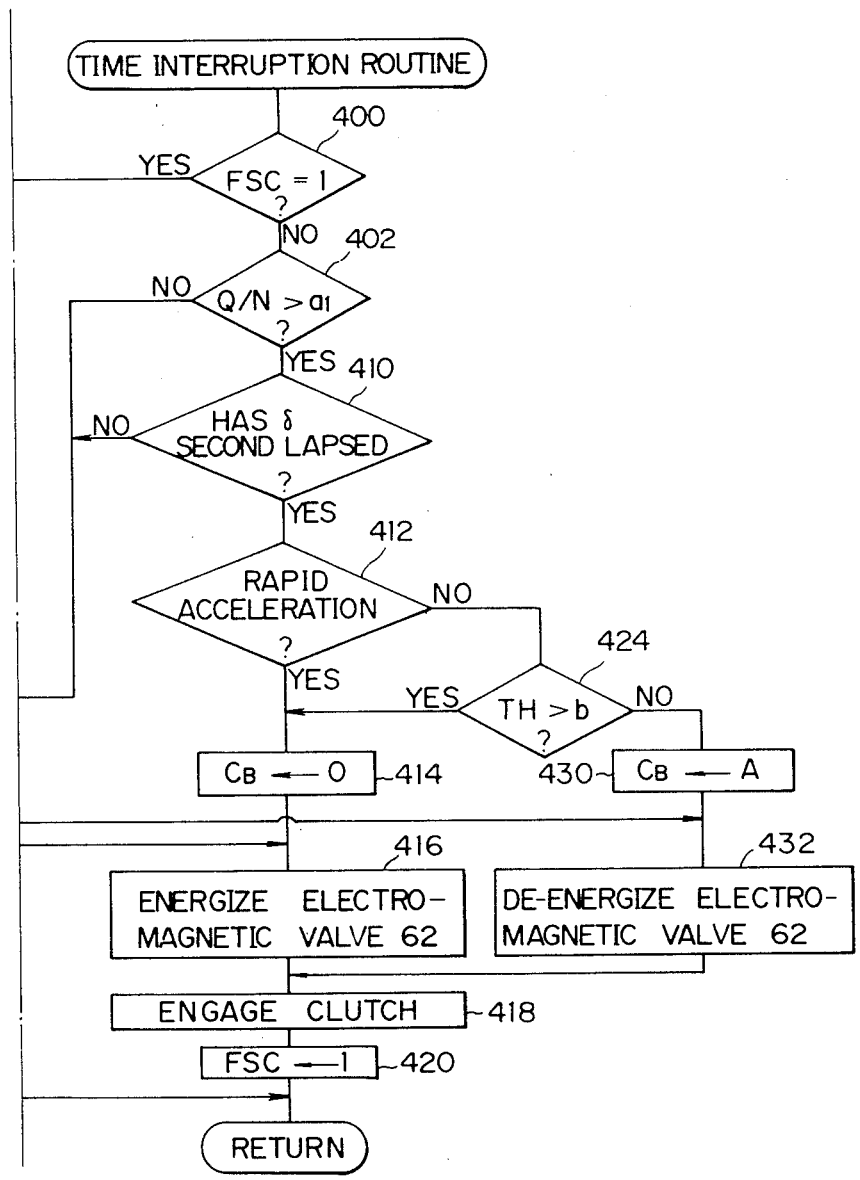

FIG. 17 shows a construction of the first embodiment of the second aspect of the present invention. As will be easily seen, this construction of the embodiment is substantially the same as FIG. 1, and therefore, a detailed description thereof is omitted. FIG. 18 is a flow chart indicating a routine for attaining control of the clutch 41 as well as the pressure switching valve 62. This routine is different from the routines of FIGS. 4 and 5 in that the routine for controlling the clutch and the routine for controlling the switching valve are combined in the same flow chart. Since many step attained by FIG. 18 have already appeared in FIGS. 4 and 5, the explanation of FIG. 18 is mainly focused on the points which differ from FIGS. 4 and 5. When the engine is under the low load condition, the flag FSC is "0" and Q/N is smaller than $a_1$. Thus, the routine goes, from points 400 and 402, to points 404, 406, and 408, where the switching valve 62 is de-energized to allow the intake vacuum to act on the diaphragm 60a and open the by-pass control valve 58, the clutch 41 is disengaged to disconnect the supercharger from the crankshaft 16, and the flag FSC is reset (0).

When the engine is under acceleration, the routine goes from points 400 and 402 to point 410, where it is judged if a small time $\delta$ has lapsed from the start of the acceleration. The delay time prevents the clutch 41 from being incorrectly operated due to a noise signal generated by an "overshoot" occurring when the engine enters a transient state.

After this delay time has lapsed, the routine goes to point 412, where it is judged whether this acceleration is rapid by detecting, for example, the rate of change of signals from the throttle sensor 70 indicating the degree of throttle opening.

At point 424, it is judged whether the degree of the throttle opening TH is higher than a predetermined value b. When the engine is under rapid acceleration or the throttle valve 32 is wide open, the routine goes to points 414, 416, 418, and 420, where the counter $C_B$ is cleared, the pressure switching valve 62 is energized to allow a high pressure at the pressure taking-out port 64 to directly act on the diaphragm 60a to instantly close the by-pass control valve 58, the clutch 41 is engaged to connect the crankshaft 16 with the supercharger 38, and the flag FSC is set (1). In short, the full supercharging effect is immediately obtained when the engine is under rapid acceleration or the throttle valve is wide open.

Figure 19:
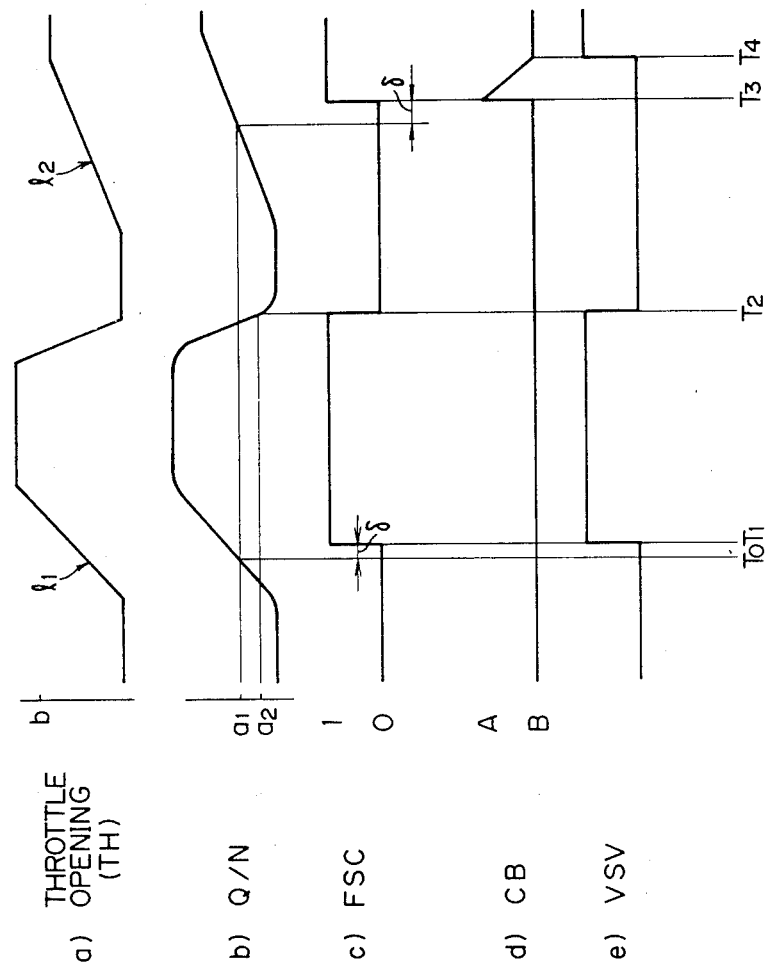
FIG. 19 is a timing chart indicating the operation of the embodiment of FIG. 17.

When the engine is at the beginning of a moderate acceleration with a small degree of opening of the throttle valve, the routine goes from points 412 and 424 to point 430, where the counter $C_B$ or counting the time from the beginning of the moderate acceleration with a small degree of the throttle opening is set to A, and to points 432, 418 and 420, so that the pressure switching valve 62 is de-energized to allow the high pressure at the port 64 to be opened to the diaphragm 60a via the pressure transmitting delay device 66, causing the by-pass control valve 58 to be gradually closed. Thus, the supercharging effect is weakened when the engine is under a moderate acceleration. After the moderate acceleration has commenced, the routine flows from point 400, to points 426, 428, 434, 432, 418, and 420, for attaining a weak supercharging operation. This operation for weakening the supercharging effect during the moderate acceleration continues so long as the count-down of the counter $C_B$ is effected at point 434. After a predetermined time corresponding to the initial set value A of the counter $C_B$ (point 430) has lapsed, the routine goes from point 428 to point 416 and the weakening control of the supercharger during the moderate acceleration is cancelled. FIG. 19 shows a timing chart illustrating the operation of the first embodiment. When the engine is under such as acceleration wherein the degree of opening of the throttle valve changes rapidly as shown by a line $l_1$ in FIG. 19-(a) or the degree of opening of the throttle valve is larger than b, the intake air amount to engine speed ratio Q/N exceeds the slice level $a_1$ at time $T_0$ and, after the short delay time $\delta$ has lapsed, the clutch 41 is engaged for rotating the supercharger while the pressure switching valve 62 is energized at time $T_1$ as shown by (e), so that the full supercharging effect is instantly obtained without being weakened. Due to the full supercharging effect obtained from the beginning of the acceleration, a rapid increase in engine torque can be obtained which matches the rapid acceleration or the wide open throttle valve.

When the engine enters into a deceleration state, the clutch 41 is disengaged while the pressure switching valve 62 is deenergized at time $T_2$ as shown by (c) and (e) of FIG. 19. Then the engine again enters into an acceleration state as shown by a curve $l_2$, where the rate of change in the opening of the throttle valve is moderate or the degree of opening of the throttle valve is smaller than the value b. In this case, after the delay time $\delta$ has lapsed at time $T_3$, the clutch 41 is engaged for rotating the supercharger as shown by (c), while the pressure switching valve 62 maintains its de-energized condition, until the count-down of the counter $C_B$ is completed. When the counter $C_B$ has completed the count-down at time $T_4$, the pressure switching valve 62 is energized to instantly close the by-pass control valve 58 and obtain a full supercharging effect. Due to the weakening of the effect of the supercharging effect during a moderate rate acceleration condition or partial opening of the throttle valve, a smooth increase of the torque is obtained as the time lapses from the start of the acceleration. Thus, a shock-less acceleration can be attained. In short, this embodiment of FIG. 17 allows both a quick increase in engine torque during the rapid acceleration and a shock-less switching into the supercharging condition to be obtained during a moderate acceleration.

Figure 20:
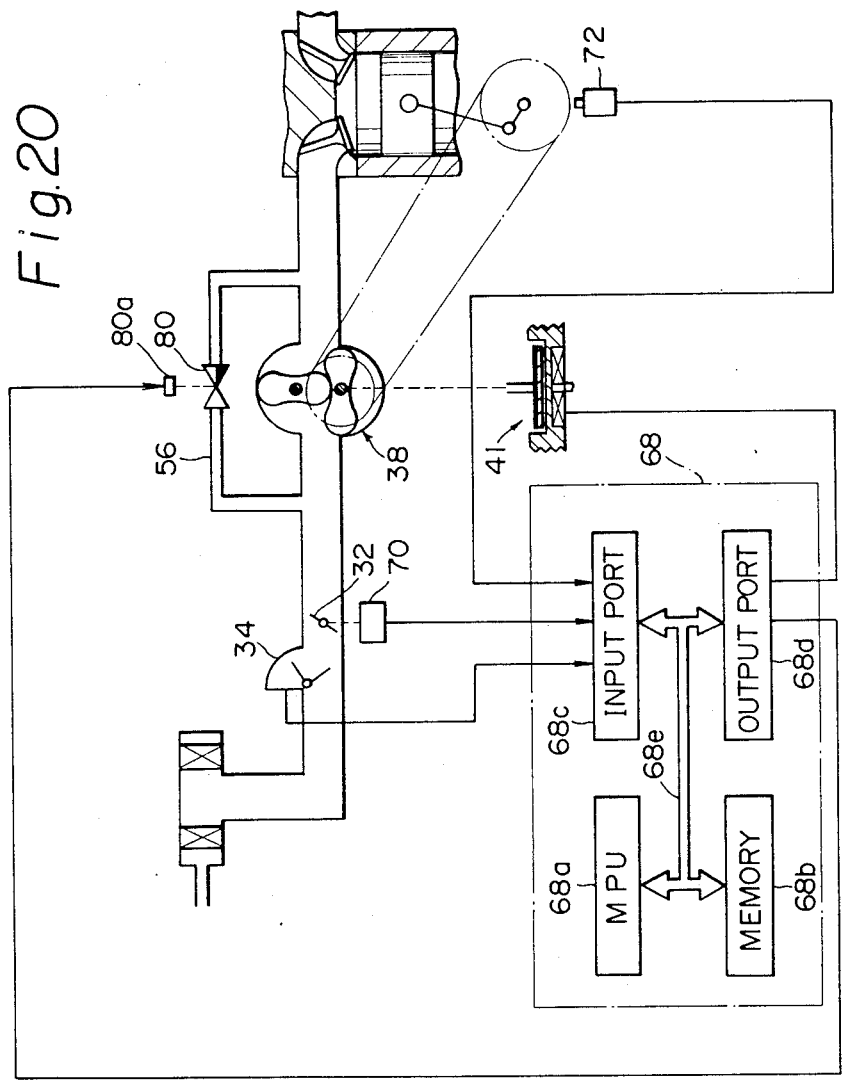
FIG. 20 is general view of another embodiment in a second aspect of the supercharged internal combustion engine.
Figure 21B:
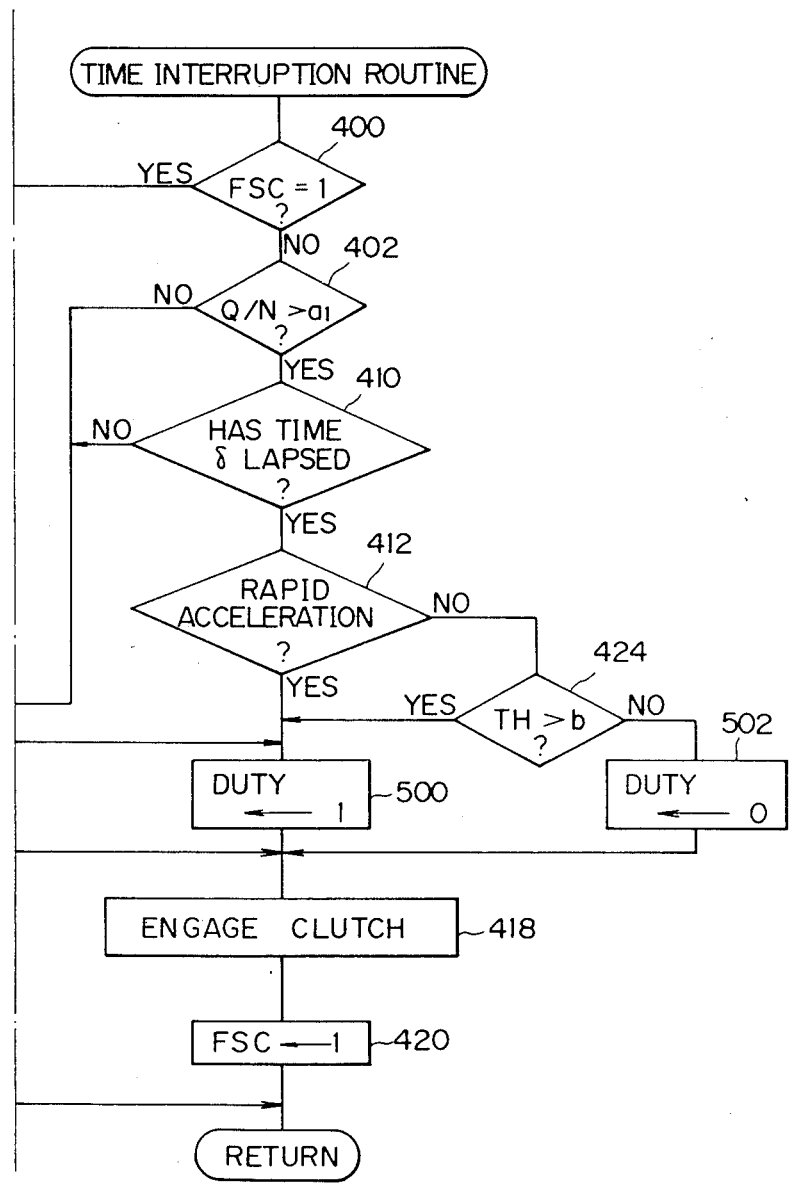

FIG. 20 shows a second embodiment of the second aspect of the present invention, which construction is, per-se, similar to the construction of FIG. 7 in the first aspect of the invention, and therefore, a detailed explanation thereof will be omitted. As in the embodiment of FIG. 7, the by-pass control valve 80 is operated by pulse signals having the calculated duty ratio, so that a desired degree of opening of the by-pass control valve 80 is similar to that described with reference to FIGS. 8 and 9. FIG. 21 is a flow chart illustrating the routine attained by the control circuit 68 for operating the clutch 41 and by-pass control valve 80. The routine attained by the flow chart has many portions which are similar not only to those in FIG. 18 in the principle of basic operation but also to those in FIG. 11 in the way of controlling the duty ratio of the pulse signals for operating the by-pass control valve 80. Therefore, in order to obviate unnecessary repetition, the routine will be very simply explained. During the steady low load condition, the routine goes from points 400 and 402 to point 498, where the zero value is moved to the memory area for storing the data of the duty ratio of the pulse signal for operating the by-pass control valve 80, in order to fully open the by-pass control valve 80. At point 406, the clutch is engaged to stop the supercharger 38, and at point 408 the flag FSC is reset.

During the acceleration, upon the elapse of the delay time $\delta$, the duty ratio DUTY instantly has a value of 1 at point 500, so that the by-pass valve 80 is fully closed if the acceleration is rapid (yes at point 412), or the throttle valve is wide open (yes at point 424). Thus, a full effect of supercharging can be instantly attained. Therefore, a quick increase in engine torque matching the rapid acceleration can be obtained.

The value of the duty ratio of the pulse signals, DUTY, is incremented at point 506 to the value of 1, if the acceleration is moderate with a partly opened throttle valve 32. Thus, the supercharging is increased at the controlled rate, so that a smooth acceleration is attained without shock when the clutch is engaged.

FIG. 22 shows a timing chart illustrating the operation of the embodiment in FIGS. 20 and 21. When the engine is rapidly accelerated as shown by the line $l_1$, the clutch is engaged while the duty ratio has a value of 1 to fully close the by-pass control valve at the instant $T_1$ after the delay time $\delta$ has lapsed. When the engine is moderately accelerated as shown by the line $l_2$, the duty ratio is gradually increased toward the value of 1 as shown by (d), so that the effect of the supercharger is weakened at the beginning of the moderate acceleration.

Figure 24B:
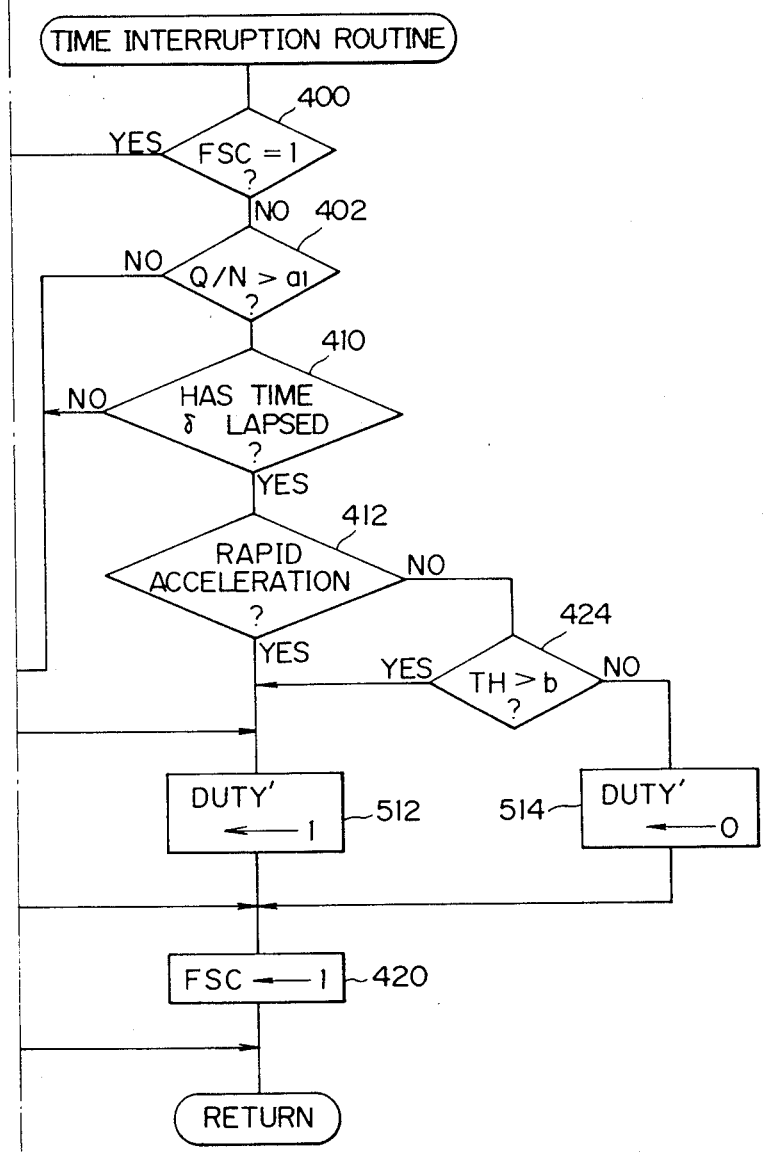

FIG. 23 shows a third embodiment of the second aspect of the present invention, which construction is similar to the embodiment in FIG. 13 in the first aspect of the invention. Therefore, a description of the detailed construction is omitted. As in the embodiment in FIG. 13, the degree of the engagement of the clutch 41 is controlled in accordance with the rate of acceleration. FIG. 24 is a flowchart illustrating a routine attained by the control circuit 68 for controlling the degree of engagement of the clutch. The routine of the FIG. 24 has many portions which are similar to FIG. 21 in the principle of operation, and to FIG. 14 in the way of control of the degree of the engagement of the clutch. During the engine low load condition, the programs flows via points 400 and 402 to point 510, where the duty ratio DUTY' is reset, so that the clutch 41 is disengaged in order to prevent the supercharger from being rotated. When the engine enters into a high load operation with the rapid acceleration or a wide-open condition of the throttle valve, the routine goes, via routines 400, 402, 410, and 412 or 424, to point 512, where the duty ratio DUTY is instantly increased to the value of 1.0 for fully engaging the clutch 41. Thus, the full effect of the supercharging is instantly attained upon the lapse of the delay time $\delta$. Thus, a sharp acceleration is attained. Contrary to this, when the engine enters into a high load operation with a slow or blunt acceleration and partially open condition of the throttle valve, the routine goes, via points 400, 402, 410, 412, and 424, to point 514, the duty ratio DUTY is first set to a zero value upon the lapse of the delay time $\delta$, and the routine then goes to points 400, 426, 516, and 518, so that the duty ratio is gradually increased to the value of 1.0. Thus, the degree of engagement of the clutch 41 is gradually increased as the time has lapsed, and finally, the duty ratio is fixed to 1.0 at point 512 where the clutch is fully engaged. The gradual engagement of the clutch at the blunt acceleration prevents a shock which would otherwise occur when the engine is moved into a supercharger operating condition.

Figure 25:
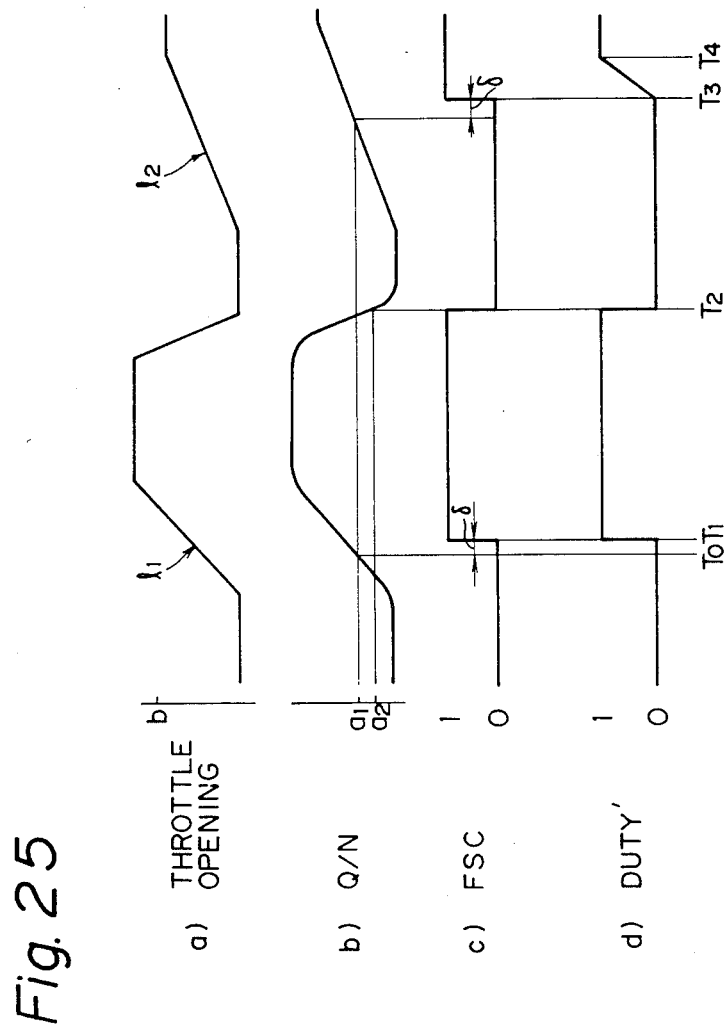
FIG. 25 shows a timing chart attained by the control circuit in FIG. 23.

FIG. 25 is a timing chart illustrating the operation of the embodiment realized by FIG. 25. During the rapid acceleration, as shown by line $l_1$ the clutch is fully engaged at time $T_1$ when the time $\delta$ has lapsed after the beginning of the acceleration. During the moderate acceleration, as shown by the line $l_2$, the clutch is gradually engaged at time $T_3$ when the time $\delta$ has lapsed after the beginning of the acceleration.

Figure 26:
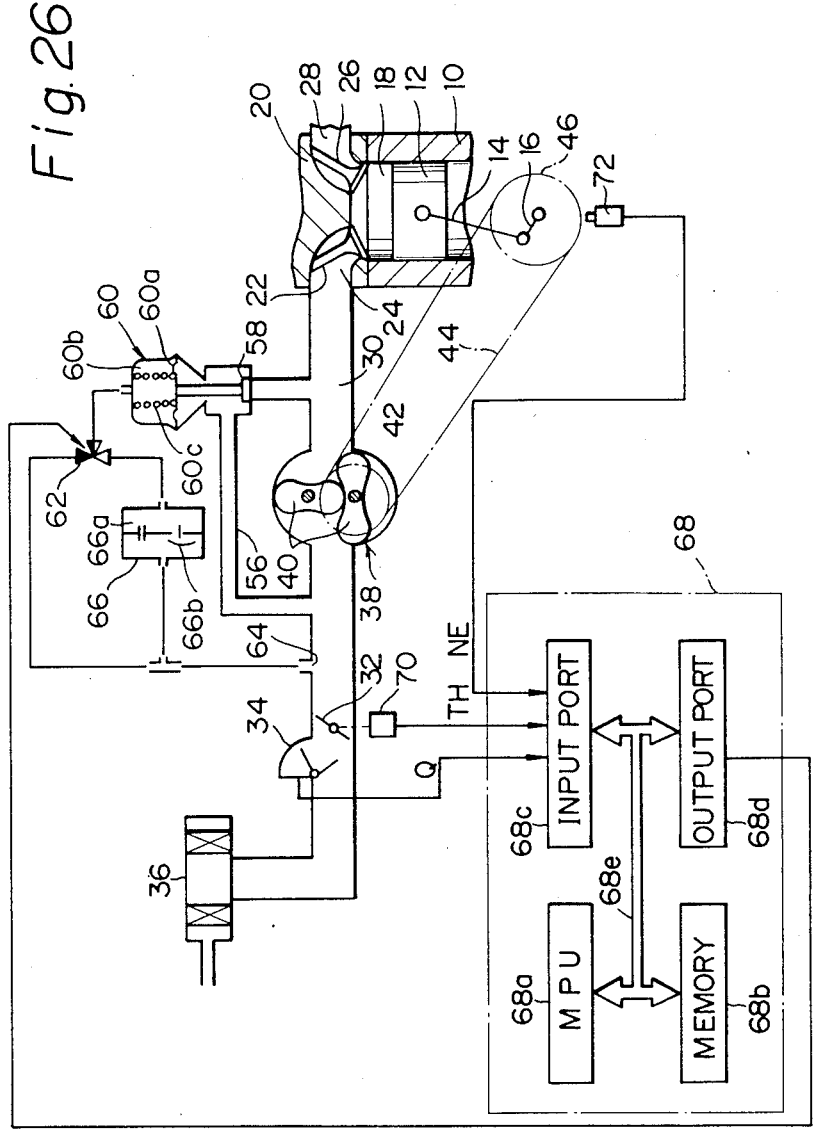
FIG. 26 is a construction of another embodiment of the present invention.
Figure 27B:
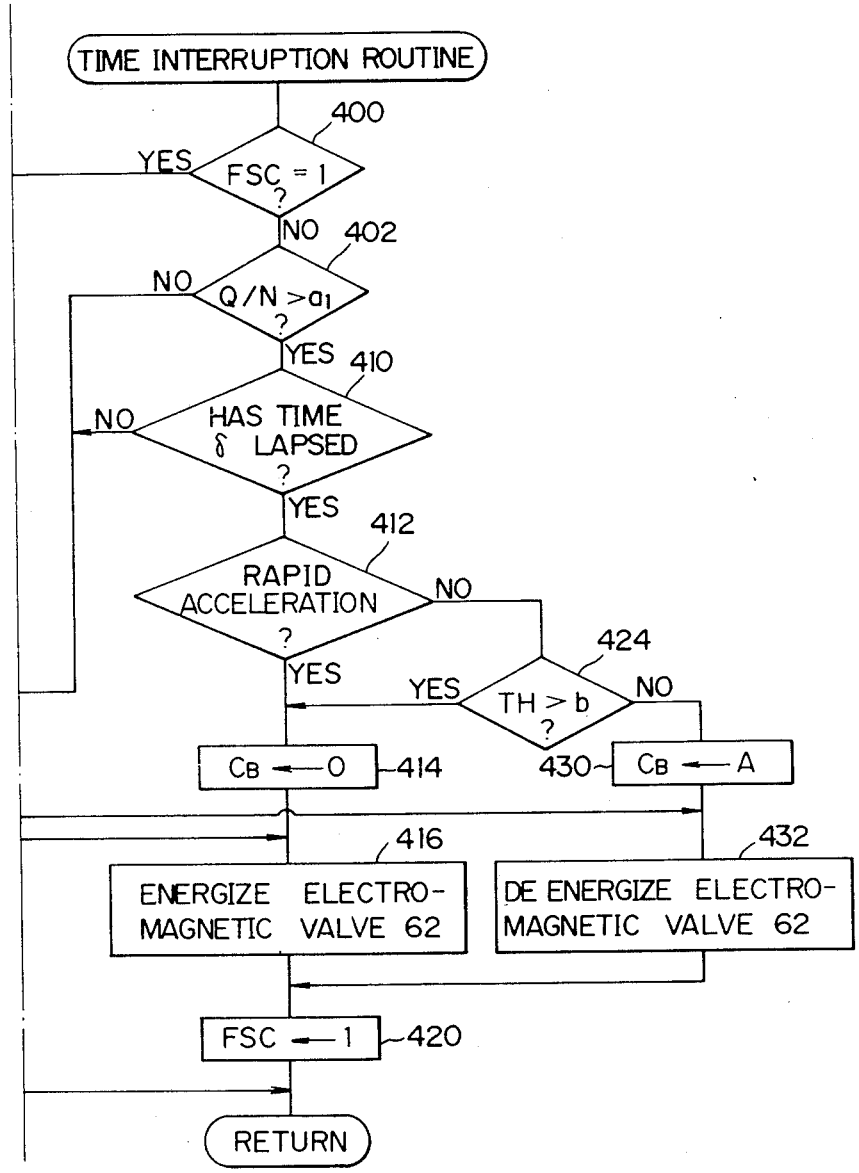

FIG. 26 shows a fourth embodiment of the second aspect of the present invention wherein the supercharger 38 is always connected to the engine crankshaft 16, similar to the embodiment in FIG. 15 in the first aspect of the present invention. FIG. 27 is a routine attained by the control circuit 68 to operate the by-pass control valve in such a manner that the by-pass control valve 58 is gradually opened so that the supercharging effect is weakened during the moderate acceleration with a partially open condition of the throttle valve. The routine of FIG. 27 is the same as the routine of FIG. 18 in the first embodiment of the second aspect of the invention, except that the routine for controlling the clutch is not provided in this embodiment.

As a modification, in the second and the third embodiment in FIGS. 7 and 13, respectively in the first aspect of the invention or FIG. 21 and 24, respectively, in the second aspect of the invention, the by-pass control valve 58 is operated by a pulse signal of the calculated duty ratio. In place of such a duty ratio control, other known means can be used to obtain the continuous control of the degree of the opening of the by-pass valve or degree of engagement of the clutch. A step motor, for example, can be used for obtaining the continuously varied opening of the by-pass control valve.

While embodiments of the present invention are described with reference to the attached drawings, many and various changes can be made by those skilled in this art without departing from the scope and spirit of the present invention.

What is claimed:

1. An intake system for a supercharged internal combustion engine, comprising:
   an intake line for introduction of an amount of intake air into the engine;
   fuel supplying means, responsive to operating conditions of the engine, for controlling the supply of fuel into the engine;
   a mechanically operated type supercharger arranged in the intake line;
   connecting means for connecting the supercharger to the engine for transmitting engine rotation to the supercharger in at least an acceleration condition of the engine;
   detecting means for detecting a period adjacent to a switching to a fuel supply condition in which the fuel supplying means operates to supply fuel from a fuel cut condition in which the fuel supply means operates to stop the supply of the fuel, and for issuing a signal indicative of the switching; and
   control means, responsive to the signal from the detecting means, for controlling the supercharger so that the supercharging pressure is decreased when the engine is accelerated from a fuel cut condition.

2. An intake system according to claim 1, wherein said detecting means comprise means for detecting the switching to the fuel supply condition from the fuel-cut condition and timer means for counting a duration time after the occurrence of the switching so as to provide said signals for decreasing the supercharging pressure.

3. An intake system according to claim 2, further comprising second detecting means for detecting a degree of acceleration, and means, responsive to the signals from the second detecting means, for controlling the supercharger so that the supercharging pressure during the acceleration of a small degree after the lapse of said time is again decreased.

4. An intake system according to claim 1, wherein said control means comprise a by-pass passsageway connected to said intake line and by-passing the supercharger, valve means arranged on said by-pass passageway means for controlling the amount of air passed through the by-pass passageway means, actuator means for operating the valve means, and drive means for producing signals directed to the actuator means so that the bypass passageway is normally closed during the acceleration condition but partly open when the engine is accelerated from a fuel cut condition.

5. An intake system according to claim 4, wherein said actuator means comprises a diaphragm actuator operatively connected to the by-pass valve means, and said drive means comprise a pressure switching valve moved between a first position and a second position, a pressure delay device, and a pressure source for producing a pressure signal representing an engine load condition, the diaphragm actuator being normally in its first position directly connected to the pressure source and being, when the engine is accelerated from a fuel cut condition, in its second position connected to the pressure source via the pressure delay device.

6. An intake system according to claim 4, wherein said actuator means comprise an electro-operated actuator mechanically connected to the by-pass control valve, and a drive means comprising means of producing electric signals directed to the actuator, the electric signal being such that the by-pass passageway is closed during a high engine load condition, while the by-pass passageway is opened during a low engine load condition, and means for modifying the signal so that the by-pass passageway is gradually closed when the engine is accelerated from a fuel cut condition.

7. An intake system according to claim 1, wherein said control means comprise clutch means arranged between the supercharger and the engine, the clutch means being engaged during a high engine load condition and disengaged during a low engine load condition, and means for controlling the degree of engagement of the clutch so that the supercharging pressure is decreased when the engine is accelerated from a fuel cut condition.

8. An intake system according to claim 1, wherein said connection means comprise clutch means located between the engine and the supercharger for selective connection of the engine rotation to the supercharger, and means for selectively engaging the clutch means when the engine is at least under the acceleration condition.

9. An intake system according to claim 1, wherein said connection means comprise mechanical connection means for always connecting the engine to the supercharger in order to transmit the engine rotation to the supercharger.

* * * * *